(12) United States Patent
Foxall et al.

(10) Patent No.: US 8,598,737 B2
(45) Date of Patent: Dec. 3, 2013

(54) SYNCHRONOUS SWITCHING POWER SUPPLY

(75) Inventors: Thomas George Foxall, Surrey (CA); Gregory Bernard Sheehan, Delta (CA)

(73) Assignee: Light-Based Technologies Incorporated, Vancouver (CA)

( * ) Notice: Subject to any disclaimer, the term of this patent is extended or adjusted under 35 U.S.C. 154(b) by 0 days.

(21) Appl. No.: 13/228,703

(22) Filed: Sep. 9, 2011

(65) Prior Publication Data
US 2012/0146414 A1    Jun. 14, 2012

Related U.S. Application Data

(60) Provisional application No. 61/422,611, filed on Dec. 13, 2010.

(51) Int. Cl.
 H02J 3/00    (2006.01)
 H02J 3/14    (2006.01)
 H02M 1/10   (2006.01)

(52) U.S. Cl.
 USPC ............................................. 307/29; 307/17

(58) Field of Classification Search
 USPC .................................................... 307/29, 17
 See application file for complete search history.

(56) References Cited

U.S. PATENT DOCUMENTS

| | | |
|---|---|---|
| 3,818,306 A | 6/1974 | Marini |
| 4,042,830 A | 8/1977 | Kellenbenz et al. |
| 4,495,554 A | 1/1985 | Simi et al. |
| 4,961,044 A | 10/1990 | Kravitz |
| 5,038,266 A | 8/1991 | Callen et al. |
| 5,124,629 A | 6/1992 | Ball et al. |
| 5,132,606 A | 7/1992 | Herbert |
| 5,402,330 A | 3/1995 | Megeid |
| 5,644,479 A | 7/1997 | Yoshida et al. |
| 5,714,863 A | 2/1998 | Hwang et al. |
| 5,905,371 A | 5/1999 | Limpaecher |
| 6,008,999 A | 12/1999 | Marrero |
| 6,038,147 A | 3/2000 | Jacobs et al. |
| 6,222,746 B1 | 4/2001 | Kim |
| 6,229,724 B1 | 5/2001 | Virtanen |
| 6,316,883 B1 | 11/2001 | Cho et al. |
| 6,384,579 B2 | 5/2002 | Watanabe |
| 6,411,535 B1 | 6/2002 | Roux |
| 6,469,917 B1 | 10/2002 | Ben-Yaakov |
| 6,646,415 B1 | 11/2003 | Nebrigic et al. |

(Continued)

OTHER PUBLICATIONS

Cheung, Martin K. H. et al., "Design and Performance Considerations of PFC Switching Regulators Based on Noncascading Structures", IEEE Transactions on Industiral Electronics, vol. 57, No. 11, Nov. 2010, pp. 3730-3745.

(Continued)

Primary Examiner — Rexford Barnie
Assistant Examiner — Dru Parries
(74) Attorney, Agent, or Firm — Oyen Wiggs Green & Mutala LLP

(57) ABSTRACT

A method for powering one or more loads from a varying input voltage comprises controlling a primary switch to selectively apply the input voltage to energize an inductor, controlling a load switch to selectively connect the inductor to the load, monitoring one or more load parameters to determine load conditions, and, when the load conditions meet a load requirement, disconnecting the load from the inductor and directing any remaining current in the inductor to a energy storage element.

5 Claims, 19 Drawing Sheets

(56) References Cited

U.S. PATENT DOCUMENTS

| | | | |
|---|---|---|---|
| 6,735,097 B1 | 5/2004 | Prasad et al. | |
| 7,072,197 B2 | 7/2006 | Peron et al. | |
| 7,092,268 B2 | 8/2006 | George | |
| 7,259,476 B2* | 8/2007 | Frey | 307/64 |
| 7,532,489 B2 | 5/2009 | Lin et al. | |
| 7,852,649 B2 | 12/2010 | Hsiao | |
| 2002/0140403 A1* | 10/2002 | Reddy | 320/162 |
| 2004/0264224 A1 | 12/2004 | Jang et al. | |
| 2005/0057951 A1 | 3/2005 | Berghegger | |
| 2007/0211504 A1 | 9/2007 | Unkrich | |
| 2008/0231115 A1 | 9/2008 | Cho et al. | |
| 2009/0196075 A1 | 8/2009 | Arduini | |
| 2010/0014330 A1 | 1/2010 | Chang et al. | |
| 2010/0194368 A1 | 8/2010 | Taylor et al. | |
| 2010/0270930 A1 | 10/2010 | Hui | |
| 2010/0270931 A1 | 10/2010 | Hui | |
| 2010/0270941 A1 | 10/2010 | Hui | |
| 2010/0270942 A1 | 10/2010 | Hui et al. | |
| 2011/0031899 A1 | 2/2011 | Chu et al. | |

OTHER PUBLICATIONS

Tse, Chi K., "Circuit Theory and Design of Power Factor Correction Power Supplies", IEEE Distinguished Lecture 2005, Circuits and Systems.

Mammano, B., "Isolated Power Conversion: making the case for secondary-side control", Texas Instruments, EDN, Jun. 7, 2011.

Texas Instruments Datasheet UCC 2960 Primary-side Startup Controller, Dec. 2000.

Fairchild PFC controller AN-42047 Application Note, Aug. 19, 2004.

\* cited by examiner

SYNCHRONOUS SWITCHING POWER SUPPLY

REFERENCE TO RELATED APPLICATION

This application claims priority from U.S. Provisional Patent Application Ser. No. 61/422,611, filed 13 Dec. 2010 and entitled "SYNCHRONOUS SWITCHING POWER SUPPLY". For the purposes of the United States of America, the benefit under 35 U.S.C. §119(e) of this application is hereby claimed, and this application is hereby incorporated herein by reference.

TECHNICAL FIELD

The invention relates to power supplies. Particular embodiments provide switched mode power supplies configured to store energy in capacitive energy storage elements.

BACKGROUND

Prior art power supplies may suffer from one or more of the following disadvantages:
- excessive heat generated from power dissipated in dissipative components;
- excessive current and/or voltage ripple in the load;
- low power factor;
- poor efficiency.

A common solution to maintain both high power factor and low current ripple is to use a two-stage power supply. The first stage satisfies the requirements for high power factor by matching the current drawn to the applied voltage and the second stage powers the load with regulated low ripple in the current or the voltage. In lighting applications it is necessary to achieve these functions at the lowest possible cost and greatest achievable efficiency. A single stage supply can provide good power factor or good load regulation, but typically not both unless extremely large capacitors are added to the design.

Some recent studies have suggested the use of non-cascading structures for power factor correction switching regulators. For example, see C. K. Tse, "Circuit Theory and Design of Power Factor Correction Power Supplies" *IEEE Distinguished Lecture* 2005, Circuits and Systems (available at http://cktse.eie.polyu.edu.hk/Tse-IEEElecture2.pdf), and M. K. H. Cheung et al., "Design and Performance Considerations of PFC Switching Regulators Based on Noncascading Structures" *IEEE Transactions on Industrial Electronics*, Vol. 57, No. 11, November 2010, both of which are hereby incorporated by reference herein.

The inventors have determined a need for power supplies that ameliorate one or more of the above disadvantages. The inventors have determined a particular need for power supplies suitable for solid state lighting applications.

SUMMARY

The following embodiments and aspects thereof are described and illustrated in conjunction with systems, tools and methods which are meant to be exemplary and illustrative, not limiting in scope.

One aspect provides a method for powering one or more loads from a varying input voltage. The method comprises controlling a primary switch to selectively apply the input voltage to energize an inductor, controlling a load switch to selectively connect the inductor to the load, monitoring one or more load parameters to determine load conditions, and, when the load conditions meet a load requirement, disconnecting the load from the inductor and directing any remaining current in the inductor to a energy storage element.

One aspect provides a power supply comprising an inductor selectably connectable to receive a varying input voltage through a primary switch, a load circuit comprising one or more loads selectably connectable to the inductor through one or more load switches, a storage circuit comprising an energy storage element selectably connectable to the inductor in one of two opposite polarities through a polarity control block, and, a controller configured to monitor load conditions of the one or more loads and generate control signals for controlling the primary switch, the one or more load switches, and the polarity control block.

Further aspects and details of example embodiments are described below.

BRIEF DESCRIPTION OF DRAWINGS

Exemplary embodiments are illustrated in referenced figures of the drawings. It is intended that the embodiments and figures disclosed herein are to be considered illustrative rather than restrictive.

DESCRIPTION

Figure 1:
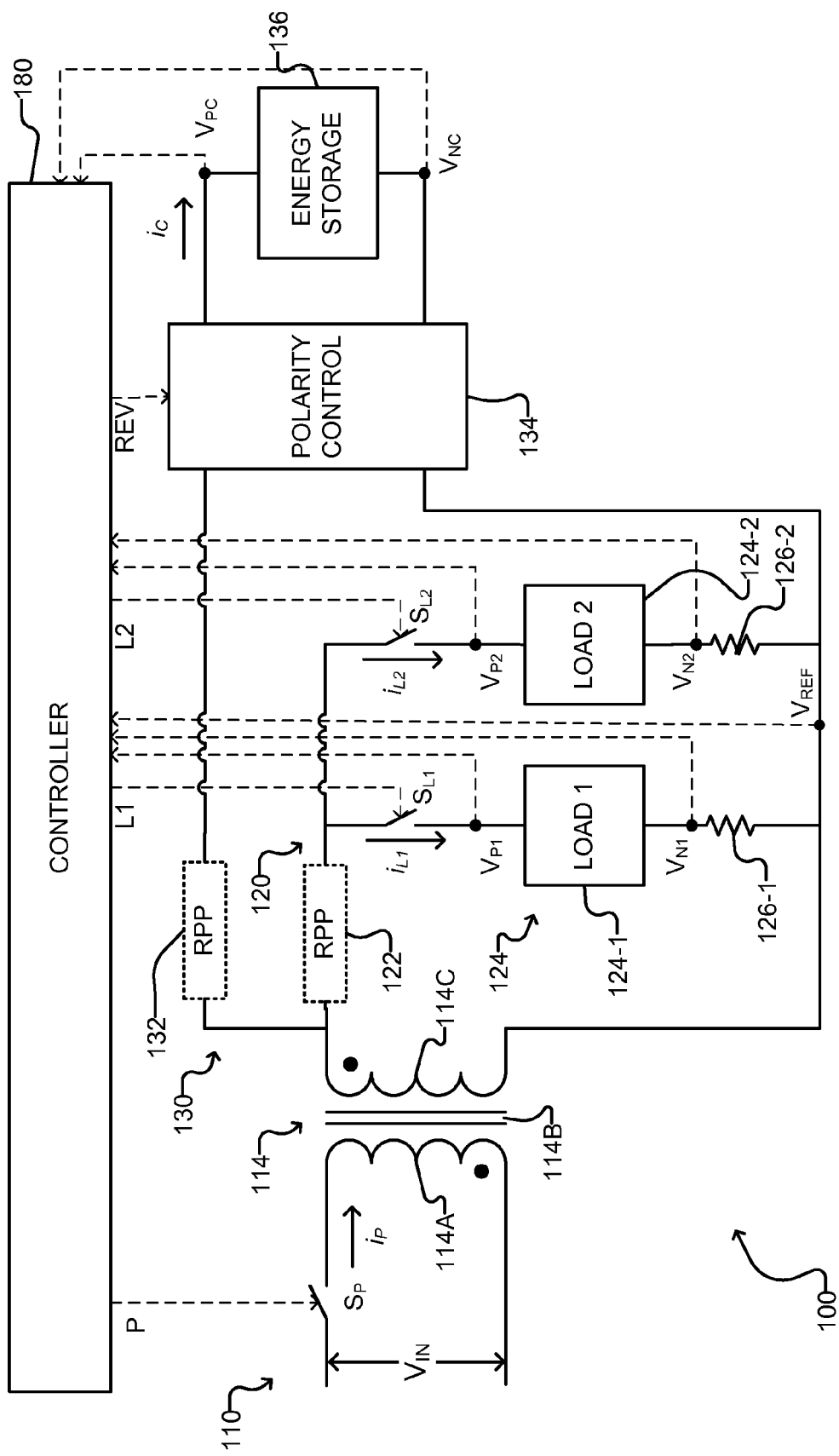
FIG. 1 is a block diagram of a power supply according to an example embodiment.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Certain embodiments provide power supplies and related methods wherein one or more loads are provided with electrical power supplied from a varying input voltage. Power supplies according to certain embodiments described below comprise synchronously controlled switches for selectively connecting an inductor to the input voltage and to the load(s), and an energy storage element configured to store excess energy when the load requirements are met and provide energy to the loads when the energy from the input voltage is insufficient to meet the load requirements. In some embodiments, a number of power supply characteristics such as power factor, efficiency, and voltage/current ripple in the load(s) may be independently optimized.

Certain embodiments of the invention make a material contribution to energy efficiency. Some embodiments of the invention provide increased energy efficiency by providing a first stage wherein power is provided to a load through an inductor and a second stage wherein power is provided to a separate energy storage element, and processing up to only one-half of the power through the second stage of the power supply, thereby eliminating one-half or more of the losses in the second stage. The inventors have determined that synchronous power supplies constructed according to certain examples described herein may provide a 2.5%-5% improvement in overall energy efficiency. Such power supplies can be applied advantageously to solid state lighting applications.

For example, in the case of a standard AC power source, the input voltage follows a sinusoidal shape with a magnitude ranging from 0 to the peak value (i.e. 170 volts in North America). In a typical application, this voltage is rectified and goes through 120 cycles per second. For a given dc load, the input voltage is higher than optimum for part of each cycle and lower than optimum at other parts of the cycle. Adding a large input capacitor at the input would stabilize the rectified voltage but adversely affect the power factor. Allowing the input current to follow the source voltage would enhance the power factor but will cause large ripples in the load current and voltage. Certain embodiments described below achieve relatively stable regulated load voltage/current while maintaining good power factor by storing energy in a separate energy storage element, and making the input current substantially follow the input voltage. During the peak segments when input energy exceeds the load requirements, the excess can be stored on the separate energy storage element, and during the low voltage segments when input energy is insufficient for the load(s), the deficit can be made up from energy from the energy storage element. This satisfies the requirements for both power factor and regulated load voltage/current.

In many prior art power supplies, large capacitors are directly connected in parallel with the load to reduce ripple. In such supplies, the same voltage appears across both the capacitors and the load, so very large capacitors are typically required to reduce ripple. The charge (Q) provided by a capacitor with capacitance C is proportional to C×dV, and dV is constrained to be low when the capacitor is directly connected in parallel with the load (it is the same as the load dV). Certain aspects of the present invention address this problem by having most of the capacitance as an independent energy storage element, such that dV on the energy storage element can vary by a much larger amount to provide substantially more charge from the same value of C (which in turn enables smaller capacitors to be used in some embodiments). Energy is transferred to the load and to the energy storage element in such a way so that the load voltage/current is substantially constant and the voltage on the energy storage element varies in accordance with the instantaneous input power.

For example, in the case of a "flyback" topology, the average output voltage or current can be set to meet the needs of the load(s). However, because the current is required to track the input voltage (for high power factor), the instantaneous power in each cycle will go above and below the average power. When the instantaneous power is above the average, the excess can be stored in the energy storage element and when the instantaneous power is below the average, power can be supplied from the energy storage element to the load (s). To maintain efficiency, the power transfer from the energy storage element to the load(s) may use a Switched Mode Power Supply implementation in some embodiments. In implementations where the voltage on the energy storage element is higher than the voltage on the load(s), a "buck"-type topology can be used to transfer energy from the energy storage element to the load(s). In some embodiments, the energy storage element is not directly connected to the load(s) such that the load(s) can remain regulated and the load(s) do not experience voltage ripple on the energy storage element.

FIG. 1 shows an example power supply 100 according to one embodiment. Supply 100 comprises an input 110 connectable to receive an input voltage $V_{IN}$. Input voltage $V_{IN}$ may comprise, for example, a varying DC voltage such as a rectified sinusoidal AC input voltage, a rectified dimmer-modulated sinusoidal AC input voltage, or other types of positive-polarity input voltages. Supplies according to other embodiments could also be adapted to receive negative-polarity input voltages by making minor changes to the circuits (e.g., reversing the polarity of diodes, etc.) to accommodate current flow in the opposite direction.

A first winding 114A of an inductor 114 is selectably connectable to input 110 through a primary switch $S_P$ in series with first winding 114A. Inductor 114 comprises a multi-winding inductor, which may sometimes be referred to as a transformer. Primary switch $S_P$ may be connected on either the high or low voltage side of first winding. When primary switch $S_P$ is connected to the high voltage side of first winding 114A, primary switch $S_P$ may comprise a high-side switch. When primary switch $S_P$ is connected to the low voltage side of first winding 114A, primary switch $S_P$ may comprise a low-side switch, and lower control voltages may be used to control primary switch $S_P$. First winding 114A is inductively coupled to a second winding 114C by a common core 114B. First winding 114A and second winding 114C may have different numbers of turns. Core 114B may be ferromagnetic or air filled or a combination thereof or other suitable material. The configuration of inductor 114 may be selected based on expected input voltages, voltage and current requirements of circuits connected to the second winding, and the operating frequency of primary switch $S_P$ of supply 100. In some embodiments, primary switch $S_P$ of supply 100 may be configured to operate at frequencies of 25-100 MHz. In some embodiments, primary switch $S_P$ of supply 100 may be configured to operate at frequencies over 1 MHz.

Primary switch $S_P$ is controlled by a controller 180 as described below to selectively provide the input voltage to first winding 114A to energize inductor 114. In some embodiments, switch $S_P$ is controlled to have a substantially constant duty cycle. In some embodiments, the duty cycle of switch $S_P$ is gradually adjusted over time to accommodate load requirements. In some embodiments, the duty cycle of switch $S_P$ may change over the period of the input voltage. For example, when the input voltage is provided through a dimmer which requires at least a holding current to be drawn therethrough to maintain the dimmer in conduction, in some embodiments the duty cycle of switch $S_P$ may be increased for portions of the input voltage period where the input voltage is near zero to maintain at least the holding current through the dimmer. In some embodiments, switch $S_P$ is configured to be open when a signal P from controller 180 has a low value, and to be closed when signal P has a high value.

A load circuit 120 is coupled to second winding 114C. Load circuit 120 comprises one or more loads 124 selectably connectable to receive current from second winding 114C. In some embodiments loads 124 may each comprise suitable power conditioning elements such as, for example, one or more capacitors connected in parallel with the load. In some embodiments, loads 124 may comprise, for example, LED lighting devices. It will be appreciated that in some embodiments supply 100 may be provided without loads 124, and instead be provided with suitable connection elements for connecting thereto. The illustrated example shows two loads 124-1 and 124-2 connected to second winding 114C through load switches $S_{L1}$ and $S_{L2}$, respectively, but it is to be understood that load circuit 120 could comprise any practical number of loads. Sensing resistors 126-1 and 126-2 may be coupled between second winding 114C and loads 124-1 and 124-2, respectively. Load circuit 120 may comprise an optional reverse polarity protector 122 coupled between the load switches and second winding 114C to simplify the timing of controlling the load switches. Reverse polarity protector 122 may, for example, comprise a diode. Alternatively, reverse polarity protector 122 may comprise a switched MOSFET, although this would be somewhat redundant as the same functionality may be provided by proper timing of control of the load switches.

Controller 180 is connected to monitor voltages $V_{P1}$, $V_{N1}$, $V_{P2}$, $V_{N2}$ and $V_{REF}$ to determine conditions of loads 124-1 and 124-2. Load switches $S_{L1}$ and $S_{L2}$ are controlled by controller 180 as described below to disconnect loads 124-1 and 124-2 from second winding 114C when their respective load requirements are met. The load requirements may comprise, for example, current requirements, voltage requirements or power requirements. In some embodiments, switches $S_{L1}$ and $S_{L2}$ are configured to be open when signals L1 and L2 from controller 180 have low values, and to be closed when signals L1 and L2 have high values.

A storage circuit 130 is also coupled to second winding 114C. Storage circuit 130 comprises an energy storage element 136 selectably connectable across second winding 114C through a polarity control block 134. Energy storage element 136 may, for example, comprise a capacitive storage element having one or more capacitors. Controller 180 is connected to monitor voltages $V_{PC}$ and $V_{NC}$ to determine the charge stored on and/or voltage of energy storage element 136. Storage circuit 130 may comprise an optional reverse polarity protector 132 coupled between polarity control block 134 and second winding 114C. Reverse polarity protector 132 may, for example, comprise a diode. Alternatively, reverse polarity protector 132 may comprise a switched MOSFET, although this would be somewhat redundant as the same functionality may be provided by proper timing of control of the switches of polarity control block 134.

Polarity control block 134 is configured to selectively reverse the polarity of connection between energy storage element 136 and second winding 114C. Polarity control block 134 is operable to selectively configure the polarity of energy storage element 136 relative to secondary winding 114C (i.e., to select which terminal of energy storage element 136 is connected to the dotted terminal of secondary winding 114C). In some embodiments, polarity control block 134 is configured to connect energy storage element 136 to second winding 114C in a first or "forward" polarity when a signal REV from controller 180 has a low value, and connect energy storage element 136 to second winding 114C in a second or "reverse" polarity opposite the first polarity when signal REV has a high value.

In some embodiments, polarity control block 134 is also operable to selectively disconnect energy storage element 136 from second winding 114C. In such embodiments, reverse polarity protector 132 may be omitted, and controller may generate additional signals to control polarity control block 134.

Figure 1A:
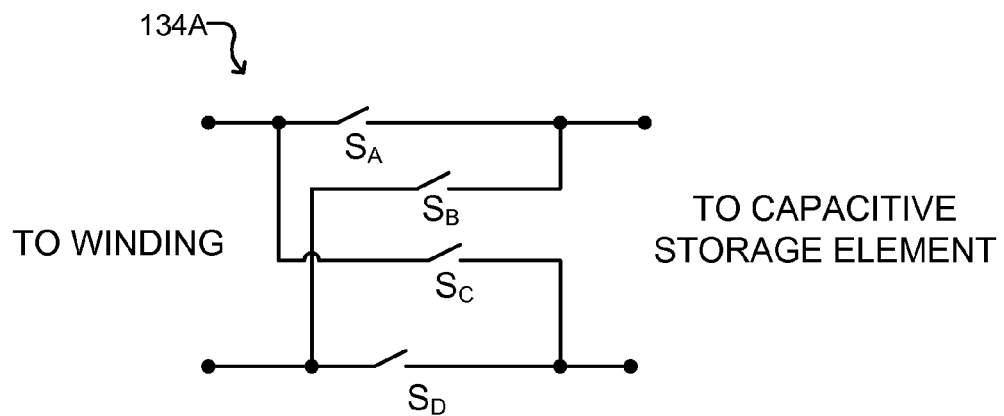
FIG. 1A shows an example polarity control block according to one embodiment.

FIG. 1A shows an example polarity control block 134A according to one embodiment. Polarity control block 134A comprises four switches $S_A$, $S_B$, $S_C$ and $S_D$. Switches $S_A$, $S_B$, $S_C$ and $S_D$ may be operated to selectively connect an energy storage element across a winding according to the following truth table (also known as a Karnaugh map), for example. In the truth table logic '0' denotes the open condition and logic '1' denotes the closed condition.

| condition | SA | SB | SC | SD |
|---|---|---|---|---|
| disconnect | 0* | 0* | 0* | 0* |
| forward polarity | 1 | 0 | 0 | 1 |
| reverse polarity | 0 | 1 | 1 | 0 |

(*One of switches $S_A$, $S_B$, $S_C$ and $S_D$ may be closed in the disconnect condition.)

Figure 1B:
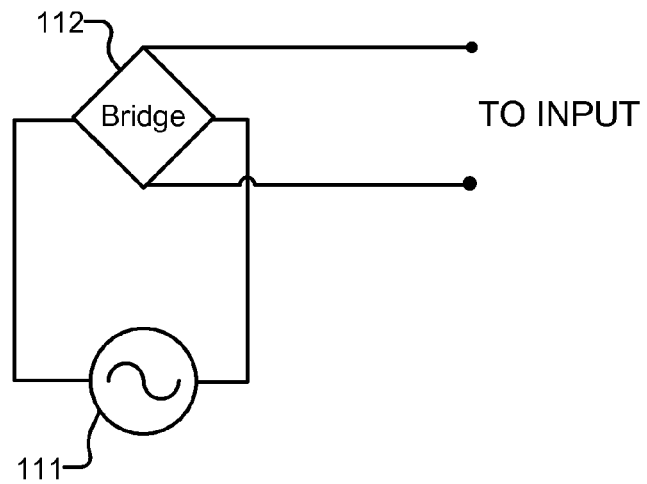
FIG. 1B shows an example source of input voltage.

FIG. 1B shows an example source of input voltage $V_{IN}$. In the FIG. 1B example, input voltage $V_{IN}$ is provided by connecting an AC power source 111 through a bridge rectifier 112.

Figure 2:
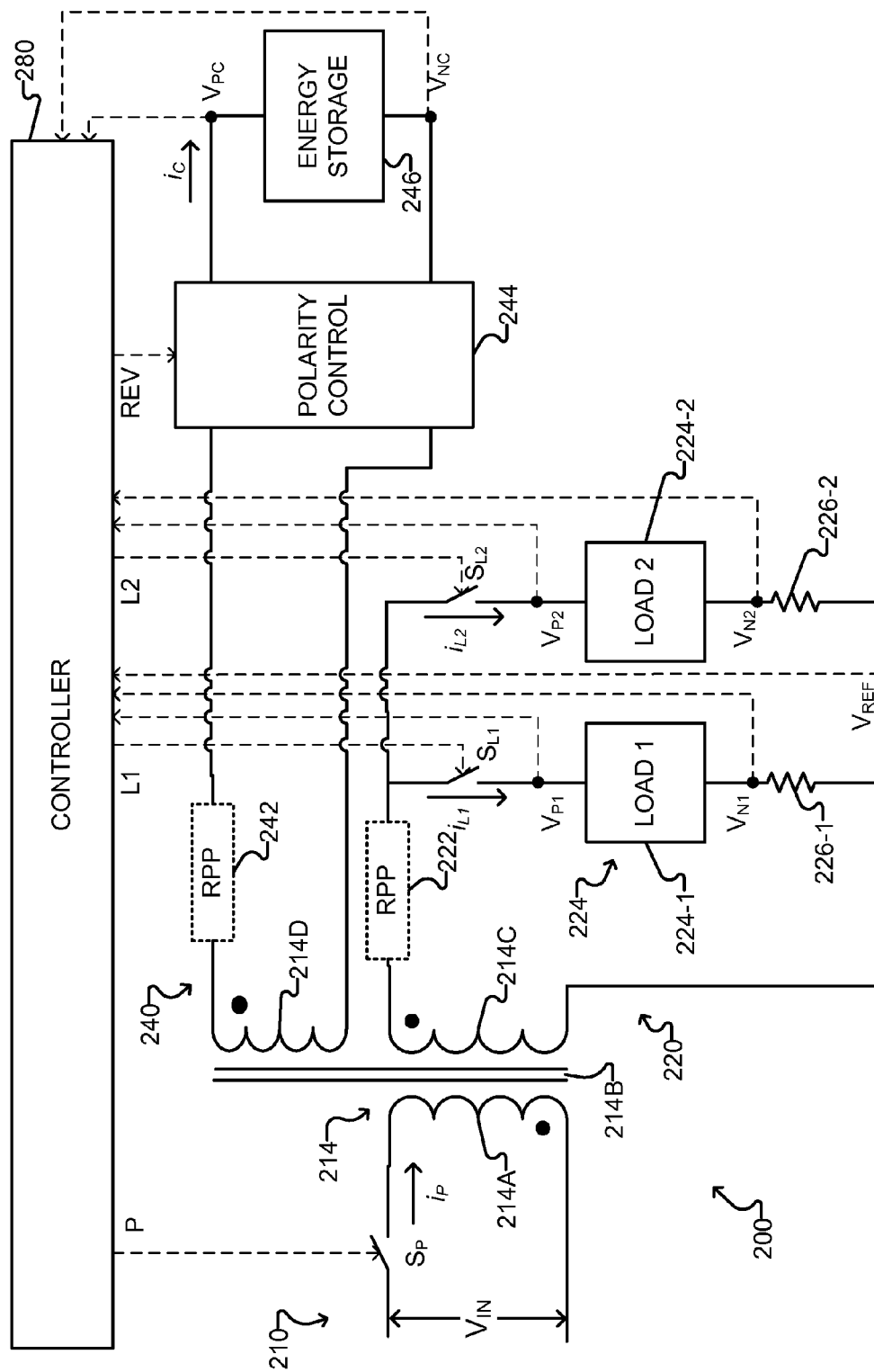
FIG. 2 is a block diagram of a power supply according to another example embodiment.

FIG. 2 shows an example power supply 200 according to one embodiment. Supply 200 comprises an input 210 connectable to receive an input voltage $V_{IN}$. Input voltage $V_{IN}$ may comprise, for example, a varying DC voltage such as a rectified sinusoidal AC input voltage, a rectified dimmer-modulated sinusoidal AC input voltage, or other types of input voltages.

A first winding 214A of an inductor 214 is selectably connectable to input 210 through a primary switch $S_P$ in series with first winding 214A. Primary switch $S_P$ may be connected on either the high or low voltage side of first winding. When primary switch $S_P$ is connected to the high voltage side of first winding 214A, primary switch $S_P$ may comprise a high-side switch. When primary switch $S_P$ is connected to the low voltage side of first winding 214A, primary switch $S_P$ may comprise a low-side switch, and lower control voltages may be used to control primary switch $S_P$. First winding 214A is inductively coupled to a second winding 214C and a third winding 214D by a common core 214B. First winding 214A, second winding 214C and third winding 214D may have different numbers of turns. Core 214B may be ferromagnetic or air filled or a combination thereof or other suitable material. The configuration of inductor 214 may be selected based on expected input voltages, voltage and current requirements of circuits connected to the second winding, and the operating frequency of primary switch $S_P$ of supply 200. In some embodiments, primary switch $S_P$ of supply 200 may be configured to operate at frequencies of 25-100 MHz. In some embodiments, primary switch $S_P$ of supply 200 may be configured to operate at frequencies over 1 MHz.

Primary switch $S_P$ is controlled by a controller 280 as described below to selectively provide the input voltage to first winding 214A to energize inductor 214. In some embodiments, switch $S_P$ is controlled to have a substantially constant duty cycle. In some embodiments, the duty cycle of switch $S_P$ is gradually adjusted over time to accommodate load requirements. In some embodiments, the duty cycle of switch $S_P$ may change over the period of the input voltage. For example, when the input voltage is provided through a dimmer which requires at least a holding current to be drawn therethrough to maintain the dimmer in conduction, in some embodiments the duty cycle of switch $S_P$ may be increased for portions of the input voltage period where the input voltage is near zero to maintain at least the holding current through the dimmer. In some embodiments, switch $S_P$ is configured to be open when a signal P from controller 280 has a low value, and to be closed when signal P has a high value.

A load circuit 220 is coupled to second winding 214C. Load circuit 220 comprises one or more loads 224 selectably connectable to receive current from second winding 214C. In some embodiments loads 224 may each comprise suitable power conditioning elements such as, for example, one or more capacitors connected in parallel with the load. In some embodiments, loads 224 may comprise, for example, LED lighting devices. It will be appreciated that in some embodiments supply 200 may be provided without loads 224, and instead be provided with suitable connection elements for connecting thereto. The illustrated example shows two loads 224-1 and 224-2 connected to second winding 214C through load switches $S_{L1}$ and $S_{L2}$, respectively, but it is to be understood that load circuit 220 could comprise any practical number of loads. Sensing resistors 226-1 and 226-2 may be coupled between second winding 214C and loads 224-1 and 224-2, respectively. Load circuit 220 may comprise an optional reverse polarity protector 222 coupled between the load switches and second winding 214C to simplify the timing of controlling the load switches. Reverse polarity protector 222 may, for example, comprise a diode. Alternatively, reverse polarity protector 222 may comprise a switched MOSFET, although this would be somewhat redundant as the same functionality may be provided by proper timing of control of the load switches.

Controller 280 is connected to monitor voltages $V_{P1}$, $V_{N1}$, $V_{P2}$, $V_{N2}$ and $V_{REF}$ to determine conditions of loads 224-1 and 224-2. Load switches $S_{L1}$ and $S_{L2}$ are controlled by controller 280 as described below to disconnect loads 224-1 and 224-2 from second winding 214C when their respective load requirements are met. The load requirements may comprise, for example, current requirements, voltage requirements or power requirements. In some embodiments, switches $S_{L1}$ and $S_{L2}$ are configured to be open when signals L1 and L2 from controller 280 have low values, and to be closed when signals L1 and L2 have high values.

A storage circuit 240 is coupled to third winding 214D. Storage circuit 240 comprises an energy storage element 246 selectably connectable across third winding 214D through a polarity control block 244. Energy storage element 246 may, for example, comprise a capacitive storage element having one or more capacitors. As one skilled in the art will appreciate, providing storage circuit 240 on a different winding from load circuit 220 permits storage circuit 240 to operate at a different voltage level from load circuit 220. In some embodiments, storage circuit 240 may be configured to operate at a higher voltage than load circuit 220, such that energy storage element 246 may operate at a voltage higher than a maximum operating voltage for load circuit 220. This in turn permits smaller and/or more reliable capacitors (such as, for example, ceramic capacitors) to be used in energy storage element 246 to store the same amount of energy as larger capacitors operated at lower voltages. Controller 280 is connected to monitor voltages $V_{PC}$ and $V_{NC}$ to determine the charge stored on and/or voltage of energy storage element 246. Storage circuit 240 may comprise an optional reverse polarity protector 242 coupled between polarity control block 244 and third winding 214D. Reverse polarity protector 242 may, for example, comprise a diode. Alternatively, reverse polarity protector 242 may comprise a switched MOSFET, although this would be somewhat redundant as the same functionality may be provided by proper timing of control of the switches of polarity control block 244. Polarity control block 244 may be substantially similar to blocks 134 and/or 134A as described above. In embodiments wherein polarity control block 244 is also operable to selectively disconnect energy storage element 246 from third winding 214D, reverse polarity protector 242 may be omitted.

Figure 3:
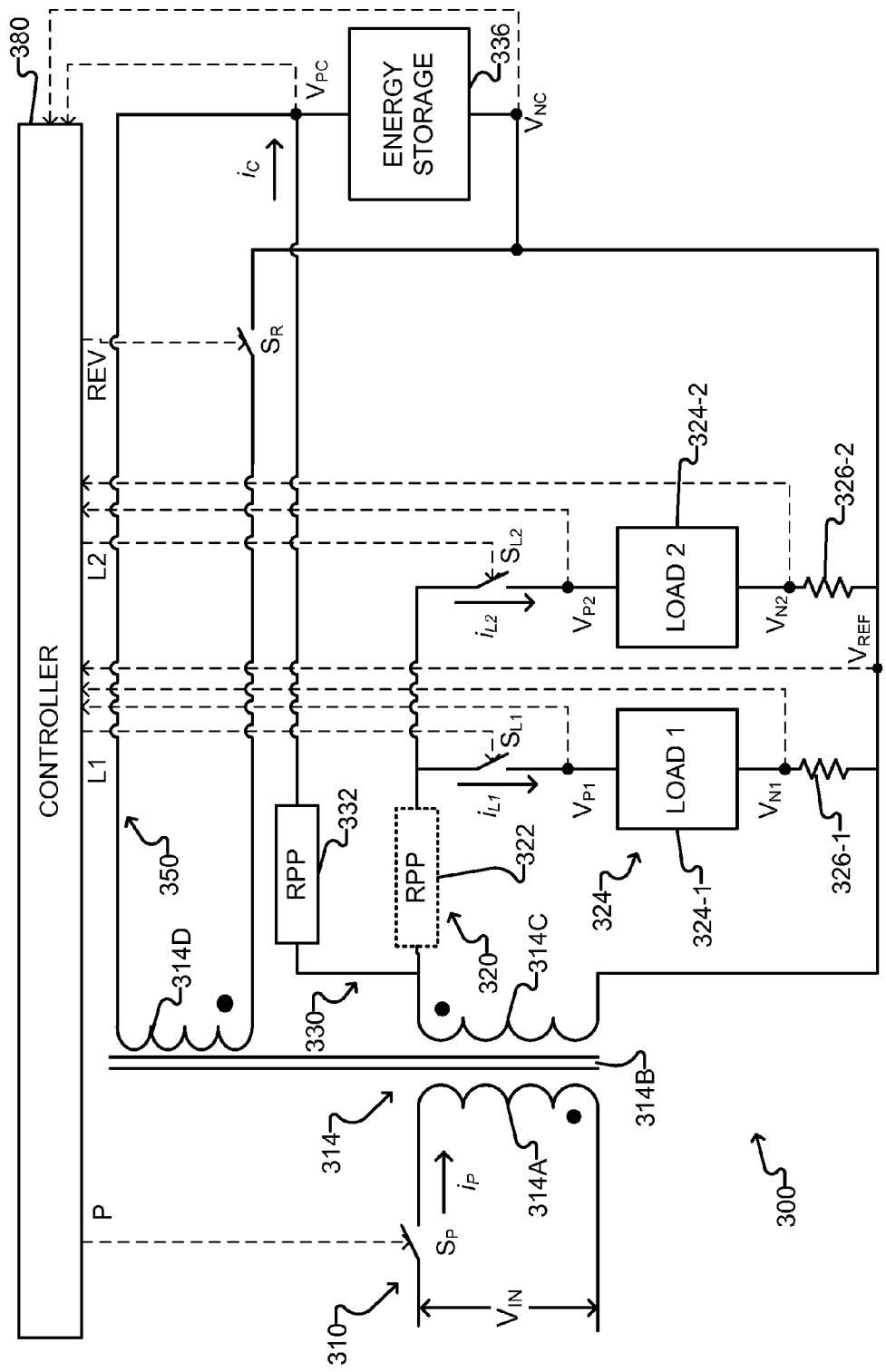
FIG. 3 is a block diagram of a power supply according to another example embodiment.

FIG. 3 shows an example power supply 300 according to one embodiment. Supply 300 comprises an input 310 connectable to receive an input voltage $V_{IN}$. Input voltage $V_{IN}$ may comprise, for example, a varying DC voltage such as a rectified sinusoidal AC input voltage, a rectified dimmer-modulated sinusoidal AC input voltage, or other types of input voltages.

A first winding 314A of an inductor 314 is selectably connectable to input 310 through a primary switch $S_P$ in series with first winding 314A. Primary switch $S_P$ may be connected on either the high or low voltage side of first winding. When primary switch $S_P$ is connected to the high voltage side of first winding 314A, primary switch $S_P$ may comprise a high-side switch. When primary switch $S_P$ is connected to the low voltage side of first winding 314A, primary switch $S_P$ may comprise a low-side switch, and lower control voltages may be used to control primary switch $S_P$. First winding 314A is inductively coupled to a second winding 314C and a third winding 314D by a common core 314B. First winding 314A, second winding 314C and third winding 314D may have different numbers of turns. Core 314B may be ferromagnetic or air filled or a combination thereof or other suitable material. The configuration of inductor 314 may be selected based on expected input voltages, voltage and current requirements of circuits connected to the second winding, and the operating frequency of primary switch $S_P$ of supply 300. In some embodiments, primary switch $S_P$ of supply 300 may be configured to operate at frequencies of 25-100 MHz. In some embodiments, primary switch $S_P$ of supply 300 may be configured to operate at frequencies over 1 MHz.

Primary switch $S_P$ is controlled by a controller 380 as described below to selectively provide the input voltage to first winding 314A to energize inductor 314. In some embodiments, switch $S_P$ is controlled to have a substantially constant duty cycle. In some embodiments, the duty cycle of switch $S_P$ is gradually adjusted over time to accommodate load requirements. In some embodiments, the duty cycle of switch $S_P$ may change over the period of the input voltage. For example, when the input voltage is provided through a dimmer which requires at least a holding current to be drawn therethrough to maintain the dimmer in conduction, in some embodiments the duty cycle of switch $S_P$ may be increased for portions of the input voltage period where the input voltage is near zero to maintain at least the holding current through the dimmer. In some embodiments, switch $S_P$ is configured to be open when a signal P from controller 380 has a low value, and to be closed when signal P has a high value.

A load circuit 320 is coupled to second winding 314C. Load circuit 320 comprises one or more loads 324 selectably connectable to receive current from second winding 314C. In some embodiments loads 324 may each comprise suitable power conditioning elements such as, for example, one or more capacitors connected in parallel with the load. In some embodiments, loads 324 may comprise, for example, LED lighting devices. It will be appreciated that in some embodiments supply 300 may be provided without loads 324, and instead be provided with suitable connection elements for connecting thereto. The illustrated example shows two loads 324-1 and 324-2 connected to second winding 314C through load switches $S_{L1}$ and $S_{L2}$, respectively, but it is to be understood that load circuit 320 could comprise any practical number of loads. Sensing resistors 326-1 and 326-2 may be coupled between second winding 314C and loads 324-1 and 324-2, respectively. Load circuit 320 may comprise an optional reverse polarity protector 322 coupled between the load switches and second winding 314C to simplify the timing of controlling the load switches. Reverse polarity protector 322 may, for example, comprise a diode. Alternatively, reverse polarity protector 322 may comprise a switched MOSFET, although this would be somewhat redundant as the same functionality may be provided by proper timing of control of the load switches.

Controller 380 is connected to monitor voltages $V_{P1}$, $V_{N1}$, $V_{P2}$, $V_{N2}$ and $V_{REF}$ to determine conditions of loads 324-1 and 324-2. Load switches $S_{L1}$ and $S_{L2}$ are controlled by controller 380 as described below to disconnect loads 324-1 and 324-2 from second winding 314C when their respective load requirements are met. The load requirements may comprise, for example, current requirements, voltage requirements or power requirements. In some embodiments, switches $S_{L1}$ and $S_{L2}$ are configured to be open when signals L1 and L2 from controller 380 have low values, and to be closed when signals L1 and L2 have high values.

A storage circuit 330 is also coupled to second winding 314C. Storage circuit 330 comprises an energy storage element 336 connected in a forward polarity across second winding 314C through a reverse polarity protector 332. Reverse polarity protector 332 may, for example, comprise a diode or a switched MOSFET. Energy storage element 336 may, for example, comprise a capacitive storage element having one or more capacitors. Controller 380 is connected to monitor voltages $V_{PC}$ and $V_{NC}$ to determine the charge stored on and/or voltage of energy storage element 336.

A discharge circuit 350 is coupled to third winding 314D. Discharge circuit 350 comprises a reverse switch $S_R$ for selectively connecting energy storage element 336 in a reverse polarity across third winding 314D. In some embodiments, reverse switch $S_R$ is configured to connect energy storage element 336 to third winding 314D when a signal REV from controller 380 has a high value, and disconnect energy storage element 336 from third winding 314D when signal REV has a low value.

Figure 4:
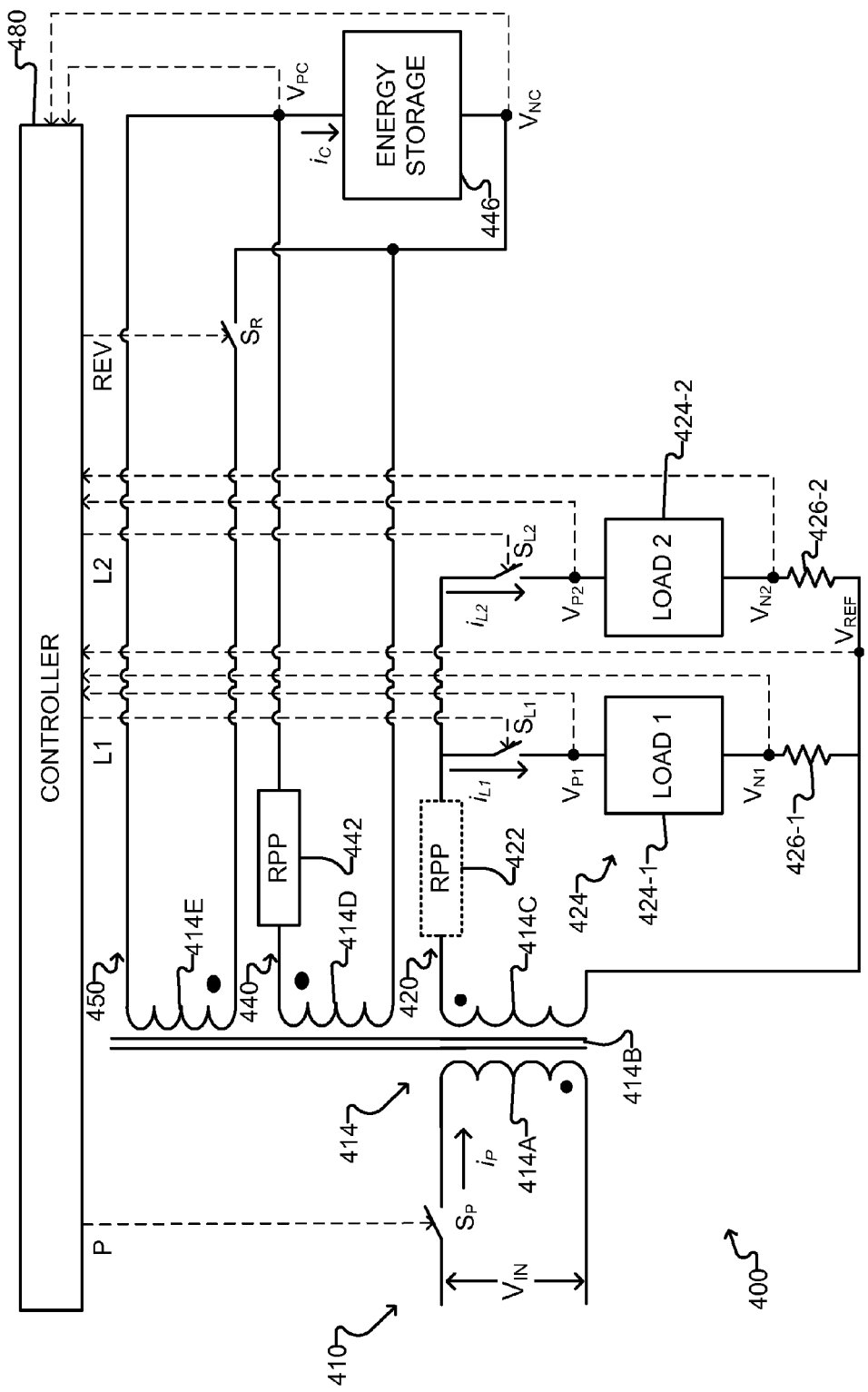
FIG. 4 is a block diagram of a power supply according to another example embodiment.

FIG. 4 shows an example power supply 400 according to one embodiment. Supply 400 comprises an input 410 connectable to receive an input voltage $V_{IN}$. Input voltage $V_{IN}$ may comprise, for example, a varying DC voltage such as a rectified sinusoidal AC input voltage, a rectified dimmer-modulated sinusoidal AC input voltage, or other types of input voltages.

A first winding 414A of an inductor 414 is selectably connectable to input 410 through a primary switch $S_P$ in series with first winding 414A. Primary switch $S_P$ may be connected on either the high or low voltage side of first winding. When primary switch $S_P$ is connected to the high voltage side of first winding 414A, primary switch $S_P$ may comprise a high-side switch. When primary switch $S_P$ is connected to the low voltage side of first winding 414A, primary switch $S_P$ may comprise a low-side switch, and lower control voltages may be used to control primary switch $S_P$. First winding 414A is inductively coupled to a second winding 414C, a third winding 414D and a fourth winding 414E by a common core 414B. First winding 414A, second winding 414C, third winding 414D and fourth winding 414E may have different numbers of turns. Core 414B may be ferromagnetic or air filled or a combination thereof or other suitable material. The configuration of inductor 414 may be selected based on expected input voltages, voltage and current requirements of circuits connected to the second winding, and the operating frequency of primary switch $S_P$ of supply 400. In some embodiments, primary switch $S_P$ of supply 400 may be configured to operate at frequencies of 25-100 MHz. In some embodiments, primary switch $S_P$ of supply 400 may be configured to operate at frequencies over 1 MHz.

Primary switch $S_P$ is controlled by a controller 480 as described below to selectively provide the input voltage to first winding 414A to energize inductor 414. In some embodiments, switch $S_P$ is controlled to have a substantially constant duty cycle. In some embodiments, the duty cycle of switch $S_P$ is gradually adjusted over time to accommodate load requirements. In some embodiments, the duty cycle of switch $S_P$ may change over the period of the input voltage. For example, when the input voltage is provided through a dimmer which requires at least a holding current to be drawn therethrough to maintain the dimmer in conduction, in some embodiments the duty cycle of switch $S_P$ may be increased for portions of the input voltage period where the input voltage is near zero to maintain at least the holding current through the dimmer. In some embodiments, switch $S_P$ is configured to be open when a signal P from controller 480 has a low value, and to be closed when signal P has a high value.

A load circuit 420 is coupled to second winding 414C. Load circuit 420 comprises one or more loads 424 selectably connectable to receive current from second winding 414C. In some embodiments loads 424 may each comprise suitable power conditioning elements such as, for example, one or more capacitors connected in parallel with the load. In some embodiments, loads 424 may comprise, for example, LED lighting devices. It will be appreciated that in some embodiments supply 400 may be provided without loads 424, and instead be provided with suitable connection elements for connecting thereto. The illustrated example shows two loads 424-1 and 424-2 connected to second winding 414C through load switches $S_{L1}$ and $S_{L2}$, respectively, but it is to be understood that load circuit 420 could comprise any practical number of loads. Sensing resistors 426-1 and 426-2 may be coupled between second winding 414C and loads 424-1 and 424-2, respectively. Load circuit 420 may comprise an optional reverse polarity protector 422 coupled between the load switches and second winding 414C to simplify the timing of controlling the load switches. Reverse polarity protector 422 may, for example, comprise a diode. Alternatively, reverse polarity protector 422 may comprise a switched MOSFET, although this would be somewhat redundant as the same functionality may be provided by proper timing of control of the load switches.

Controller 480 is connected to monitor voltages $V_{P1}$, $V_{N1}$, $V_{P2}$, $V_{N2}$ and $V_{REF}$ to determine conditions of loads 424-1 and 424-2. Load switches $S_{L1}$ and $S_{L2}$ are controlled by controller 480 as described below to disconnect loads 424-1 and 424-2 from second winding 414C when their respective load requirements are met. The load requirements may comprise, for example, current requirements, voltage requirements or power requirements. In some embodiments, switches $S_{L1}$ and $S_{L2}$ are configured to be open when signals L1 and L2 from controller 480 have low values, and to be closed when signals L1 and L2 have high values.

A storage circuit 440 is coupled to third winding 414D. Storage circuit 440 comprises an energy storage element 446 connected in a forward polarity across third winding 414D through a reverse polarity protector 442. Reverse polarity protector 442 may, for example, comprise a diode or a switched MOSFET. Energy storage element 446 may, for example, comprise a capacitive storage element having one or more capacitors. As one skilled in the art will appreciate, providing storage circuit 440 on a different winding from load circuit 420 permits storage circuit 440 to operate at a different voltage level from load circuit 420. In some embodiments, storage circuit 440 may be configured to operate at a higher voltage than load circuit 420, such that energy storage element 446 may operate at a voltage higher than a maximum operating voltage for load circuit 420. This in turn permits smaller and/or more reliable capacitors (such as, for example, ceramic capacitors) to be used in energy storage element 446 to store the same amount of energy as larger capacitors operated at lower voltages. Controller 480 is connected to monitor voltages $V_{PC}$ and $V_{NC}$ to determine the charge stored on and/or voltage of energy storage element 446.

A discharge circuit 450 is coupled to a fourth winding 414E. Discharge circuit 450 comprises a reverse switch $S_R$ for selectively connecting energy storage element 446 in a reverse polarity across fourth winding 414E. In some embodiments, reverse switch $S_R$ is configured to connect energy storage element 446 to fourth winding 414E when a signal REV from controller 480 has a high value, and disconnect energy storage element 446 from fourth winding 414E when signal REV has a low value.

Figure 5:
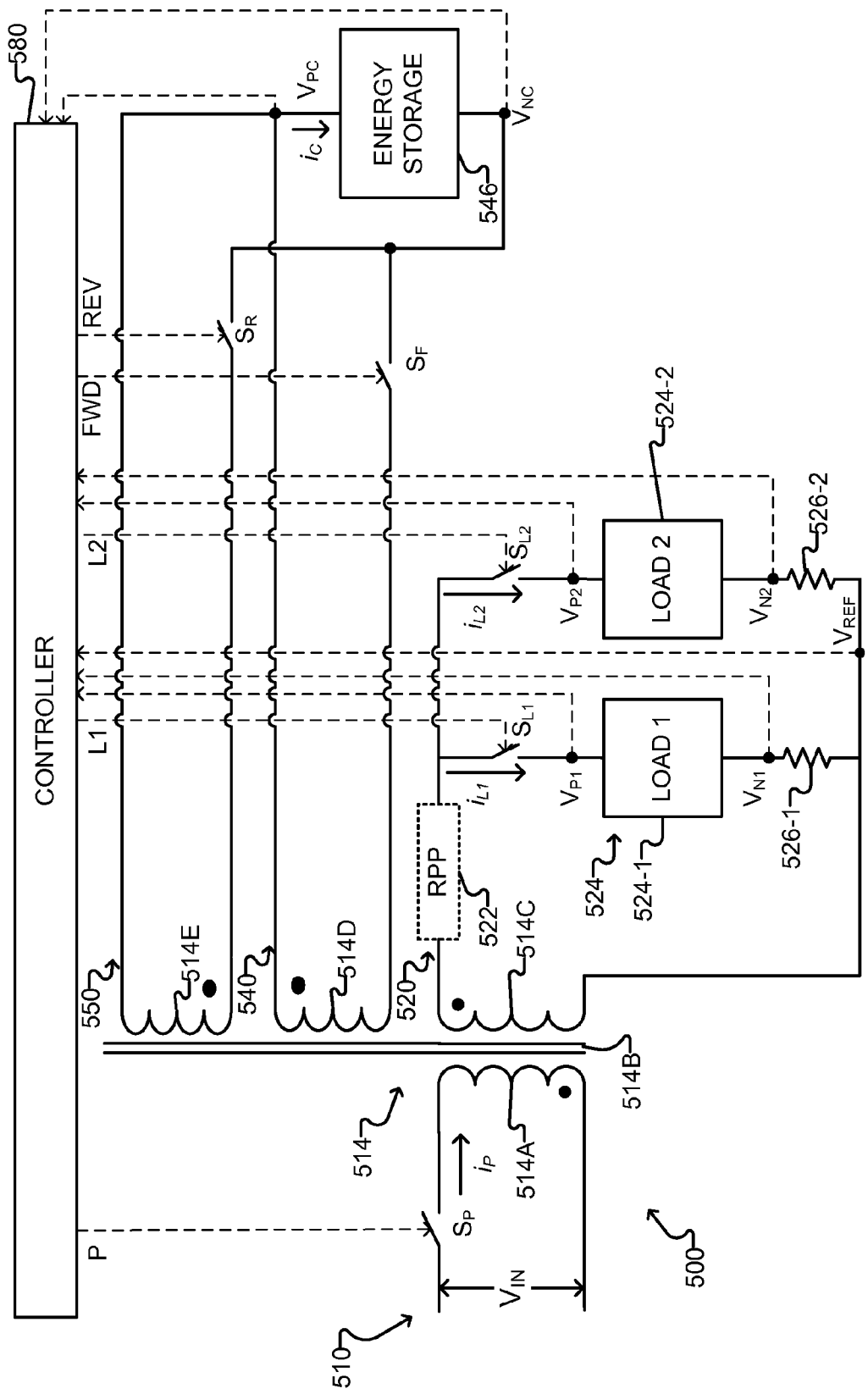
FIG. 5 is a block diagram of a power supply according to another example embodiment.

FIG. 5 shows an example power supply 500 according to one embodiment. Supply 500 comprises an input 510 connectable to receive an input voltage $V_{IN}$. Input voltage $V_{IN}$ may comprise, for example, a varying DC voltage such as a rectified sinusoidal AC input voltage, a rectified dimmer-modulated sinusoidal AC input voltage, or other types of input voltages.

A first winding 514A of an inductor 514 is selectably connectable to input 510 through a primary switch $S_P$ in series with first winding 514A. Primary switch $S_P$ may be connected on either the high or low voltage side of first winding. When primary switch $S_P$ is connected to the high voltage side of first winding 514A, primary switch $S_P$ may comprise a high-side switch. When primary switch $S_P$ is connected to the low voltage side of first winding 514A, primary switch $S_P$ may comprise a low-side switch, and lower control voltages may be used to control primary switch $S_P$. First winding 514A is inductively coupled to a second winding 514C, a third winding 514D and a fourth winding 514E by a common core 514B. First winding 514A, second winding 514C, third winding 514D and fourth winding 514E may have different numbers of turns. Core 514B may be ferromagnetic or air filled or a combination thereof or other suitable material. The configuration of inductor 514 may be selected based on expected input voltages, voltage and current requirements of circuits connected to the second winding, and the operating frequency of primary switch $S_P$ of supply 500. In some embodiments, primary switch $S_P$ of supply 500 may be configured to operate at frequencies of 25-100 MHz. In some embodiments, primary switch $S_P$ of supply 500 may be configured to operate at frequencies over 1 MHz.

Primary switch $S_P$ is controlled by a controller 580 as described below to selectively provide the input voltage to first winding 514A to energize inductor 514. In some embodiments, switch $S_P$ is controlled to have a substantially constant duty cycle. In some embodiments, the duty cycle of switch $S_P$ is gradually adjusted over time to accommodate load requirements. In some embodiments, the duty cycle of switch $S_P$ may change over the period of the input voltage. For example, when the input voltage is provided through a dimmer which requires at least a holding current to be drawn therethrough to maintain the dimmer in conduction, in some embodiments the duty cycle of switch $S_P$ may be increased for portions of the input voltage period where the input voltage is near zero to maintain at least the holding current through the dimmer. In some embodiments, switch $S_P$ is configured to be open when a signal P from controller 580 has a low value, and to be closed when signal P has a high value.

A load circuit 520 is coupled to second winding 514C. Load circuit 520 comprises one or more loads 524 selectably connectable to receive current from second winding 514C. In some embodiments loads 524 may each comprise suitable power conditioning elements such as, for example, one or more capacitors connected in parallel with the load. In some embodiments, loads 524 may comprise, for example, LED lighting devices. It will be appreciated that in some embodiments supply 500 may be provided without loads 524, and instead be provided with suitable connection elements for connecting thereto. The illustrated example shows two loads 524-1 and 524-2 connected to second winding 514C through load switches $S_{L1}$ and $S_{L2}$, respectively, but it is to be understood that load circuit 520 could comprise any practical number of loads. Sensing resistors 526-1 and 526-2 may be coupled between second winding 514C and loads 524-1 and 524-2, respectively. Load circuit 520 may comprise an optional reverse polarity protector 522 coupled between the load switches and second winding 514C to simplify the timing of controlling the load switches. Reverse polarity protector 522 may, for example, comprise a diode. Alternatively, reverse polarity protector 522 may comprise a switched MOSFET, although this would be somewhat redundant as the same functionality may be provided by proper timing of control of the load switches.

Controller 580 is connected to monitor voltages $V_{P1}$, $V_{N1}$, $V_{P2}$, $V_{N2}$ and $V_{REF}$ to determine conditions of loads 524-1 and 524-2. Load switches $S_{L1}$ and $S_{L2}$ are controlled by controller 580 as described below to disconnect loads 524-1 and 524-2 from second winding 514C when their respective load requirements are met. The load requirements may comprise, for example, current requirements, voltage requirements or power requirements. In some embodiments, switches $S_{L1}$ and $S_{L2}$ are configured to be open when signals L1 and L2 from controller 580 have low values, and to be closed when signals L1 and L2 have high values.

A storage circuit 540 is coupled to third winding 514D. Storage circuit 540 comprises an energy storage element 546 selectably connectable in a forward polarity across third winding 514D through a forward switch $S_F$. Energy storage element 546 may, for example, comprise a capacitive storage element having one or more capacitors. In some embodiments, forward switch $S_F$ is configured to connect energy storage element 546 to third winding 514D when a signal FWD from controller 580 has a high value, and disconnect energy storage element 546 from third winding 514D when signal FWD has a low value. As one skilled in the art will appreciate, providing storage circuit 540 on a different winding from load circuit 520 permits storage circuit 540 to operate at a different voltage level from load circuit 520. In some embodiments, storage circuit 540 may be configured to operate at a higher voltage than load circuit 520, such that energy storage element 546 may operate at a voltage higher than a maximum operating voltage for load circuit 520. This in turn permits smaller and/or more reliable capacitors (such as, for example, ceramic capacitors) to be used in energy storage element 546 to store the same amount of energy as larger capacitors operated at lower voltages. Controller 580 is connected to monitor voltages $V_{PC}$ and $V_{NC}$ to determine the charge stored on and/or voltage of energy storage element 546.

A discharge circuit 550 is coupled to a fourth winding 514E. Discharge circuit 550 comprises a reverse switch $S_R$ for selectively connecting energy storage element 546 in a reverse polarity across fourth winding 514E. In some embodiments, reverse switch $S_R$ is configured to connect energy storage element 546 to fourth winding 514E when a signal REV from controller 580 has a high value, and disconnect energy storage element 546 from third winding 514E when signal REV has a low value.

Figure 6:
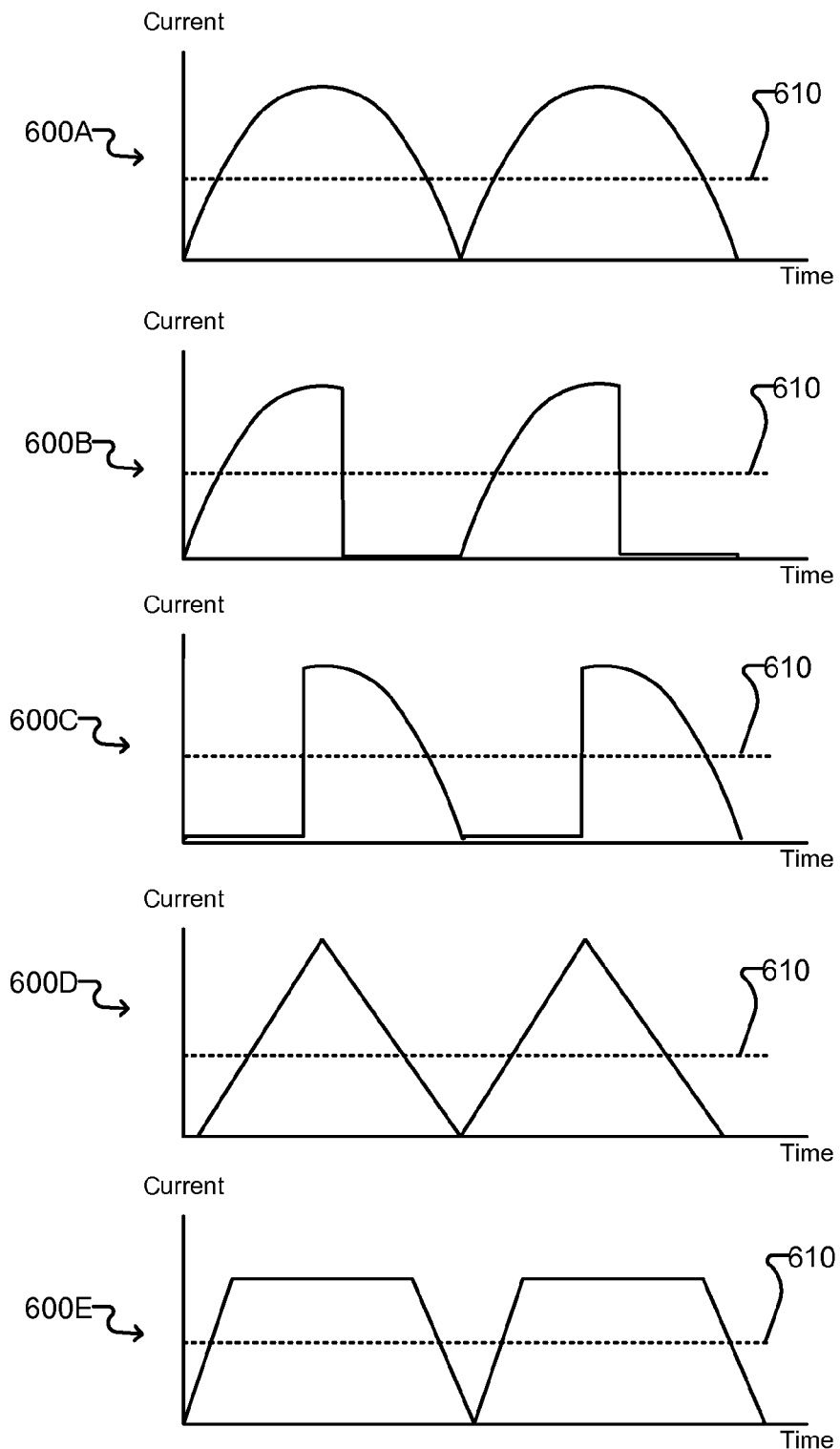
FIG. 6 shows example waveforms provided as input voltages.

FIG. 6 shows example input voltage waveforms which may be provided as input voltage $V_{IN}$ to any of supplies 100, 200, 300, 400 or 500 described above. Waveform 600A comprises a rectified sinusoidal AC waveform. Waveform 600B comprises a rectified trailing-edge phase cut AC waveform. Waveform 600C comprises a rectified leading-edge phase cut AC waveform. Waveforms 600B and 600C may, for example, be provided through phase-cut dimmers. Waveform 600D comprises a rectified triangular AC waveform. Waveform 600E comprises a rectified square AC waveform. Each of waveforms 600A-E is shown in relation to an average DC load current requirement 610. When waveforms 600A-E are above load current requirement 610, power supplies according to certain embodiments are configured to use excess current for storage in a energy storage element. When waveforms 600A-E are below load current requirement 610, power supplies according to certain embodiments are configured to provide supplementary current from the energy storage element.

Figure 7A:
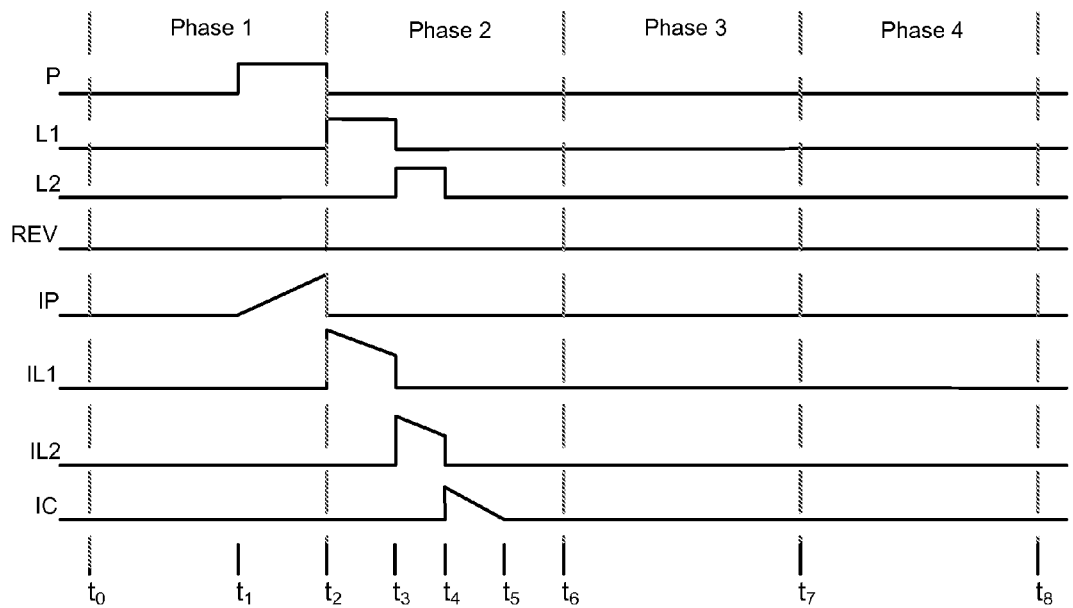
FIGS. 7A and 7B show example timing diagrams illustrating operation of power supplies according to the embodiments of FIGS. 1-4.
Figure 7B:
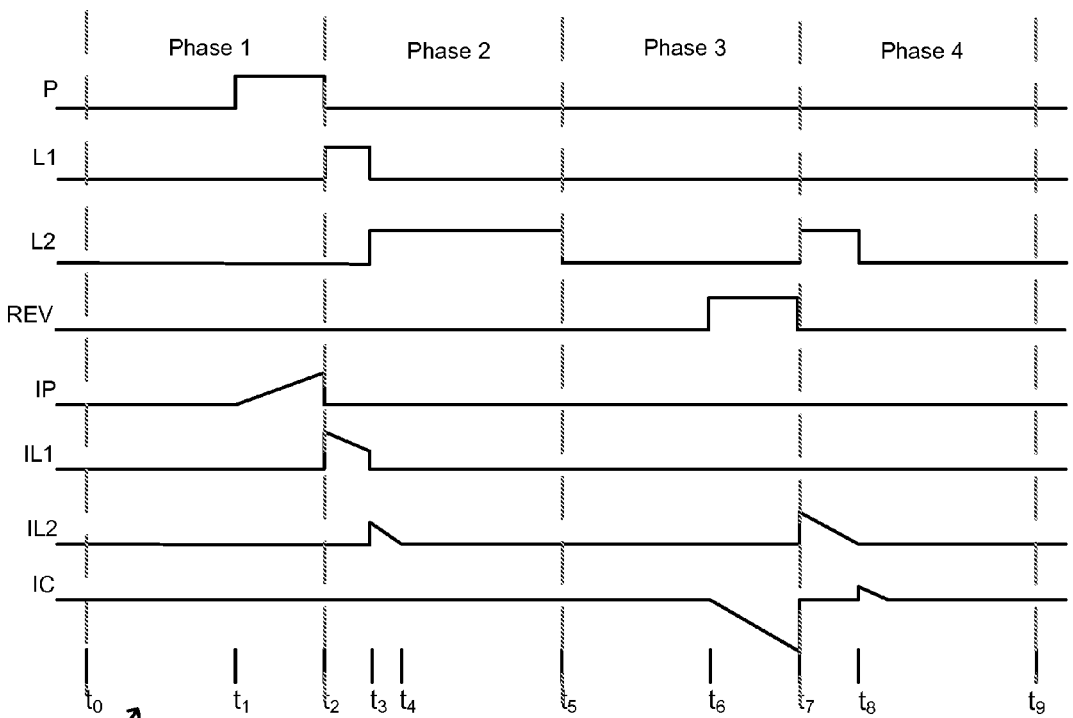
Figure 8A:
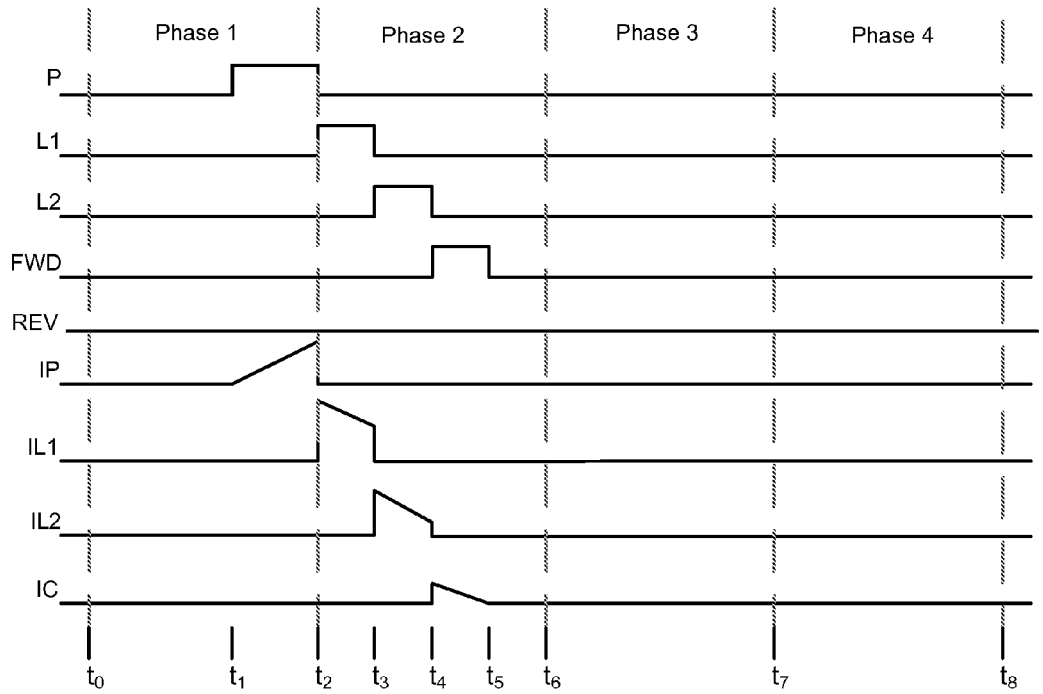
FIGS. 8A and 8B show example timing diagrams illustrating operation of power supplies according to the embodiment of FIG. 5.
Figure 8B:
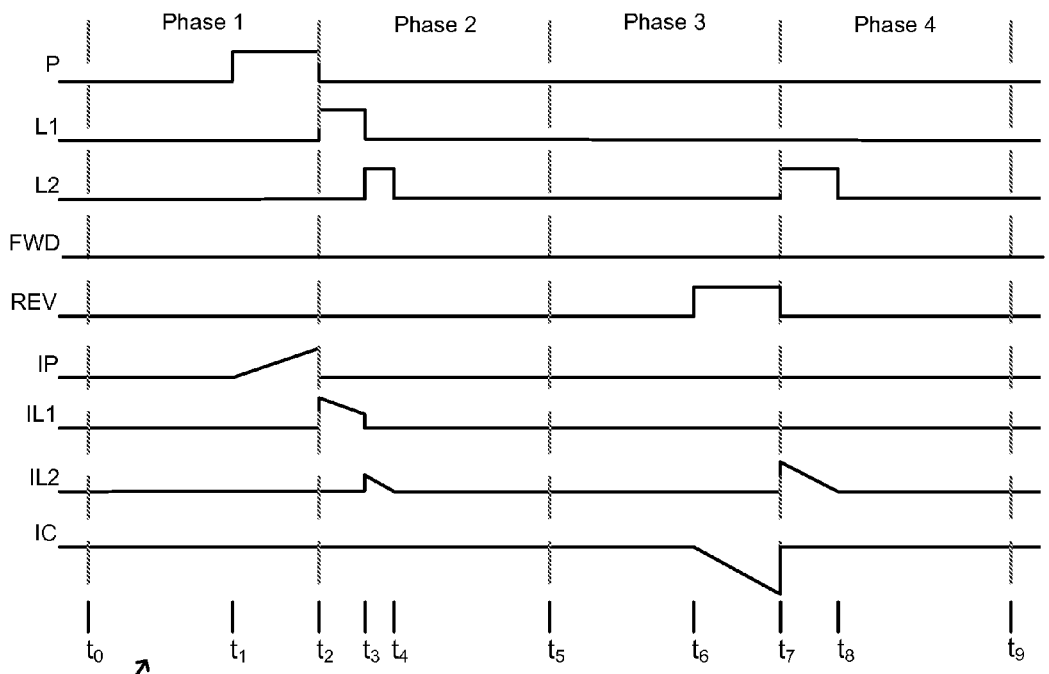

FIGS. 7A and 7B show timing diagrams 700A and 700B illustrating example operations of a power supply such as any of supplies 100, 200, 300 or 400. FIGS. 8A and 8B show timing diagrams 800A and 800B illustrating example operations of a power supply system such as supply 500. FIGS. 7A and 8A show examples wherein excess current is available for storage in an energy storage element. FIGS. 7B and 8B show examples wherein supplementary current is provided from the energy storage element.

FIGS. 7A and 7B show signals P, L1, L2 and REV for controlling corresponding switches/elements of the power supply. FIGS. 8A and 8B show the same signals, with the addition of a signal FWD for controlling a forward switch. FIGS. 7A, 7B, 8A and 8B also show resulting current traces IP, IL1, IL2 and IC provided to an inductor, first load, second load, and energy storage element, respectively, as indicated by currents $i_P$, $i_{L1}$, $i_{L2}$ and $i_C$ shown in FIGS. 1-5. The time period shown in each of FIGS. 7A, 7B, 8A and 8B is divided into four phases, individually labeled phase 1, phase 2, phase 3 and phase 4. In phase 1, an inductor is energized by providing the input voltage to the inductor. In phase 2, current is provided from the inductor to the loads until the load requirements are met, and then any excess current is used to charge the energy storage element. In phase 3, if the load requirements are not met, the inductor is energized by discharge of current from the energy storage element. In phase 4, any energy transferred to the inductor in phase 3 is provided to the loads.

Referring to FIGS. 7A and 8A, phase 1 begins at time $t_0$ with all of signals P, L1, L2, and REV (and FWD in the case of FIG. 8A) low, meaning that the primary and load switches are open and the energy storage element is either disconnected from the inductor or coupled to the inductor in a forward polarity, and currents IP, IL1, IL2 and IC are all zero. At time $t_1$ the primary switch is closed, which causes current IP to ramp up. Time $t_1$ may be adjusted based on the power requirements of the loads. For example time $t_1$ may occur earlier (as early as $t_0$) to provide more current to the inductor, or may occur later to provide less current to the inductor. In some embodiments where a power supply receives power through a thyristor-type dimmer which requires at least a holding current to maintain proper operation, time $t_1$ may also be adjusted to maintain the holding current during any valleys in the input waveform.

Phase 2 begins at time $t_2$, when the primary switch is opened and the first load switch is closed as indicated by signal L1 transitioning from low to high. When the primary switch is opened, current cannot flow back to the input so energy in the inductor must find another outlet. Closing the first load switch permits current to flow to the first load, as indicated by current trace IL1. Current does not flow to the energy storage element as long as the load(s) are at a lower voltage than the energy storage element, which is generally the case.

In some embodiments, the power supply may be controlled to perform an initialization routine upon startup to establish suitable timings for the controller and to charge the energy storage element to a desired voltage level. In some embodiments wherein the energy storage element is coupled to the same winding as the loads, the initial desired voltage level of the energy storage element may be selected to be higher than a normal operating voltage of the loads, but not so high as to risk overvoltage conditions on the loads. In some embodiments wherein the energy storage element is not coupled to the same winding as the loads (i.e., galvanically isolated from the loads), the initial desired voltage level of the energy storage element may be selected to be significantly higher than the load voltages without concern for overvoltage conditions on the loads.

In some embodiments, the controller is connected to be powered from the input voltage, and the initialization routine may comprise suitable "soft start" techniques as known in the art to ensure proper controller operation. In some embodiments, the controller is connected to be powered from a winding of the inductor other than the winding connected to the input voltage, and the initialization routine may comprise providing a series of low duty cycle pulses to the primary switch to provide power for initializing the control circuitry.

At time $t_3$ the load requirement for the first load is met, and the first load switch is opened as indicated by signal L1 transitioning from high to low. Also at time $t_3$ the second load switch is closed, as indicated by signal L2 transitioning from low to high, to enable current to flow to the second load. At time $t_4$ the load requirement for the second load is met and the second load switch is opened as indicated by signal L2 transitioning from high to low (and the forward switch is closed in the case of FIG. 8A, as indicated by signal FWD transitioning from low to high). In embodiments without a reverse polarity protector between the load switches and the inductor, the load switches should be opened substantially immediately after the respective load requirements are met and must be opened when the currents drop to zero and before they flow in the reverse direction. In embodiments with a reverse polarity protector between the load switches and the inductor, the timing of the opening of the load switches is less critical since reverse current flow is prevented by the reverse polarity protector. With both load switches open, any remaining energy in the inductor flows as current to the energy storage element. At time $t_5$ all of the energy stored in the inductor has been transferred, and current flow to the energy storage element ends. In the case of FIG. 8A, the forward switch is also opened at time $t_5$. Phase 3 begins at time $t_6$, which represents the latest time to open the load switches. At time t, phase 3 ends and phase 4 begins, and at time $t_8$ phase 4 ends. Since the load requirements were met in phase 2, no activity takes place during phases 3 and 4. In some embodiments, current is directed to the energy storage element before the load switches are closed (e.g.

by delaying the closing of any load switches for a brief period at the beginning of phase 2). Because the energy storage element is generally at a higher voltage than the load(s), it may be advantageous to supply current to the energy storage before the load(s) in some situations. Such a control scheme may be particularly advantageous in embodiments where the energy storage element uses a diode as a reverse polarity protector and the load(s) use(s) (a) switch(es) as reverse polarity protector(s). If the timing of the load switch (es) is slightly delayed, then current flows to the energy storage element, acting as protection against an open circuit secondary. In some embodiments, it may be possible to predict the current available for the storage element on a cycle to cycle basis, depending on the speed and capability of the controller.

Referring to FIGS. 7B and 8B, operation during phase 1 is the same as described above with respect to FIGS. 7A and 8A, respectively. Phase 2 begins at time $t_2$, when the primary switch is opened and the first load switch is closed, at which point current begins to flow to the first load, as indicated by current trace IL1. Current does not flow to the energy storage element as long as the loads are at a lower voltage than the energy storage element, which is generally the case.

In this case the load requirements for the first load are met at time $t_3$. At time $t_4$ IL2 drops to zero before the load requirements for the second load are met. In the FIG. 7B example the second load switch may remain closed, so long as a reverse polarity protector is provided between the inductor and the load. In the FIG. 8B example, the first and second load switches are opened at times $t_3$ and $t_4$, respectively. In some situations, the load requirements may not be met for the first load in which case load switch L1 is opened when the load current drops to zero and no other switches are closed. In embodiments wherein the load circuit comprises a reverse polarity protector, load switch L1 may optionally remain closed for the remainder of phase 2.

Phase 2 ends and phase 3 begins at time $t_5$. At time $t_6$ the energy storage element is coupled to the inductor in a reverse polarity, as indicated by signal REV transitioning from low to high. Time $t_6$ may be adjusted based on differences between the load requirements and load conditions resulting from the currents provided to the loads in phase 2. At time $t_7$ phase 3 ends and phase 4 begins, at which point the energy storage element is either disconnected from the inductor or coupled to the inductor in the forward polarity and the second load switch is closed. This causes current to again flow to the second load, as indicated by current trace IL2. At time $t_8$ the load requirement for the second load is met, and the second load switch is opened as indicated by signal L2 transitioning from high to low. Any energy remaining in the inductor at time $t_8$ may be transferred as current to the energy storage element, as indicated by the rise in trace IC at time $t_8$ in FIG. 7B. In some embodiments, time $t_6$ may be selected such that no energy remains in the inductor when the load requirements have been met at time $t_8$, as shown in FIG. 8B. At time $t_9$ phase 4 ends and phase 1 begins again.

The above examples discuss operation in situations where there is substantially zero energy remaining in the inductor at the end of phase 2. In some situations, some energy may still remain in the inductor at the end of phase 2. In such situations power supplies according to certain embodiments may be operated in a continuous mode. In the continuous mode, there is still some finite current flow at the end of phase 2, so that there is energy in the inductor at the beginning of phase 3. Generally, the controller may be configured such that continuous mode is avoided. If continuous mode happens on occasion, feedback from the system may be used to eliminate it quickly. If there is sufficient calculation capacity in the controller, the phase durations can be altered to avoid the continuous mode.

Figure 9:
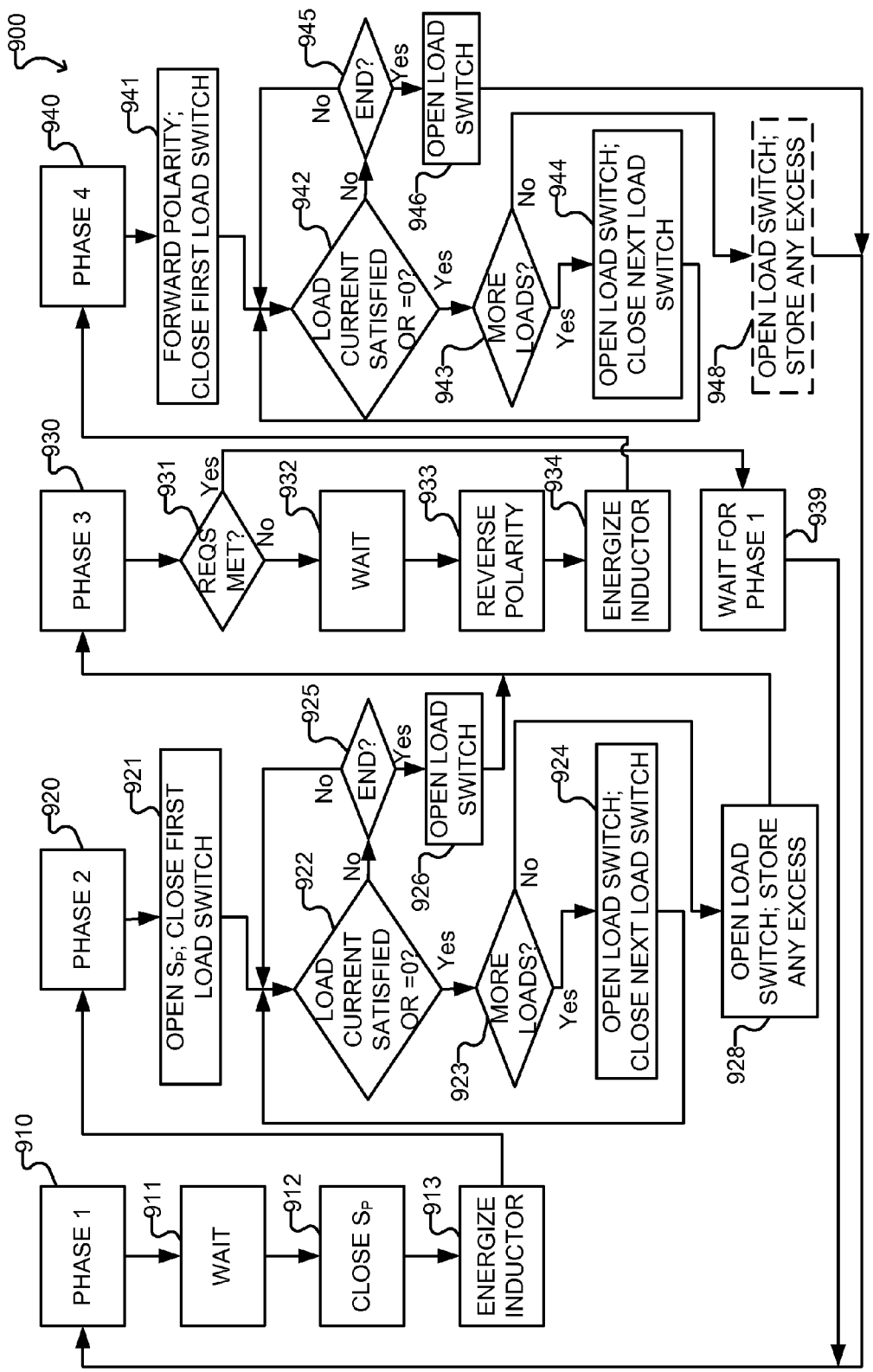
FIG. 9 is a flowchart illustrating a method according to an example embodiment.

FIG. 9 is a flowchart illustrating an example method 900 according to one embodiment. Method 900 may, for example be carried out by a controller of a power supply such as any of supplies 100, 200, 300, 400 or 500 described above. Method 900 cycles through four phases, the startings of which are indicated by blocks 910, 920, 930 and 940. In some embodiments, the controller may be configured to implement method 900 such that blocks 910, 920, 930 and 940 occur at substantially regular intervals, such that substantially fixed intervals are allotted to each of the four phases. In some embodiments, some or all of the phases may have intervals of the same duration. In some embodiments, the phases may have intervals of different durations.

Phase 1 starts at block 910. At block 911 the controller waits an amount of time based on the load power requirements. In some embodiments, the wait time may be reduced during times when the input voltage nears zero to maintain at least a holding current in implementations where the input voltage is provided through a phase-cut dimmer. At block 912 a primary switch is closed, and an inductor is energized at block 913 until the end of phase 1, at which point method 900 proceeds to block 920.

Phase 2 begins at block 920, and at block 921 the primary switch ($S_P$) is opened and the first load switch is closed to draw current from the inductor. At block 922 the controller determines the load conditions for the load whose load switch is closed (the "current load"), and compares the load conditions to one or more load requirements. If the load requirements are not met for the current load (block 922 No output) method 900 proceeds to block 925, where the controller determines if it is the end of phase 2. If not (block 925 No output), method 900 cycles through blocks 922 and 925 until either the load requirements for the current load are met (block 922 Yes output) or the end of phase 2 (block 925 Yes output). If it is the end of phase 2 (block 925 Yes output), method 900 proceeds to block 926 where the controller opens the load switch for the current load. After block 926 method 900 proceeds to block 930 to begin phase 3. If the load requirements are met for the current load (block 922 Yes output) method 900 proceeds to block 923, where the controller determines if there are more loads. If there are more loads (block 923 Yes output) method 900 proceeds to block 924. At block 924 the controller opens the load switch for the current load and closes the load switch for the next load at substantially the same time. Method 900 then returns to block 922 and repeats the sequence described above for the second load and so on until at block 923 it is determined that there are no more loads (block 923 No output), or until the end of phase 2 (block 925 Yes output). If and when the load requirements for all of the loads have been satisfied (block 923 No output), method 900 proceeds to block 928. At block 928 the controller opens the load switch and energy remaining in the inductor is stored in an energy storage element. After block 928 method 900 then proceeds to block 930 to begin phase 3.

Phase 3 starts at block 930, and at block 931 the load conditions are compared with load requirements to determine if all of the load requirements have been met. If so (block 931 Yes output) method 900 proceeds to block 939 and the controller waits for the start time for the next occurrence of phase 1 before returning to block 910 (thereby bypassing phase 4). If not (block 931 No output) the controller waits an amount of time based on differences between the load conditions and the load requirements at block 932. At block 933 the energy storage element is coupled to the inductor in a reverse polarity, and at block 934 the inductor is energized until the end of phase 3, at which point method 900 proceeds to block 940.

Phase 4 starts at block 940, and at block 941 the energy storage element is either disconnected from the inductor or coupled to the inductor in the forward polarity and the first load switch is closed to draw current from the inductor. At block 942 the controller determines the load conditions for the load whose load switch is closed (the "current load"), and compares the load conditions to one or more load requirements. If the load requirements are not met for the current load (block 942 No output) method 900 proceeds to block 945, where the controller determines if it is the end of phase 4. If not (block 945 No output), method 900 cycles through blocks 942 and 945 until either the load requirements for the current load are met (block 942 Yes output) or the end of phase 4 (block 945 Yes output). If it is the end of phase 4 (block 945 Yes output), method 900 proceeds to block 946 where the controller opens the load switch for the current load. After block 946 method 900 returns to block 910 to begin phase 1 again. If the load requirements are met for the current load (block 942 Yes output) method 900 proceeds to block 943, where the controller determines if there are more loads. If there are more loads (block 943 Yes output) method 900 proceeds to block 944. At block 944 the controller opens the load switch for the current load and closes the load switch for the next load at substantially the same time. Method 900 then returns to block 942 and repeats the sequence described above for the second load and so on until at block 943 it is determined that there are no more loads (block 943 No output), or until the end of phase 2 (block 945 Yes output). If and when the load requirements for all of the loads have been satisfied (block 943 No output), method 900 proceeds to block 948. At block 948 the controller opens the load switch and energy remaining in the inductor is stored in an energy storage element. After block 948 method 900 returns to block 910 to begin phase 1 again. Block 948 is shown in dashed outline in FIG. 9 to indicate that there will often be no energy remaining in the inductor once the load requirements are satisfied in phase 4, since the wait time at block 932 in phase 3 may be selected in consideration of the load requirements such that the inductor may be only energized just enough to meet the load requirements.

The example power supplies discussed above with respect to FIGS. 1 to 5 each have one or more loads coupled to a single winding, and also each have a single energy storage element. However, it is to be understood that these features are not required in all embodiments. For example, FIG. 10 shows an example power supply 1000 wherein loads are coupled to different windings, and FIG. 11 shows an example power supply 1100 which includes two energy storage elements.

Figure 10:
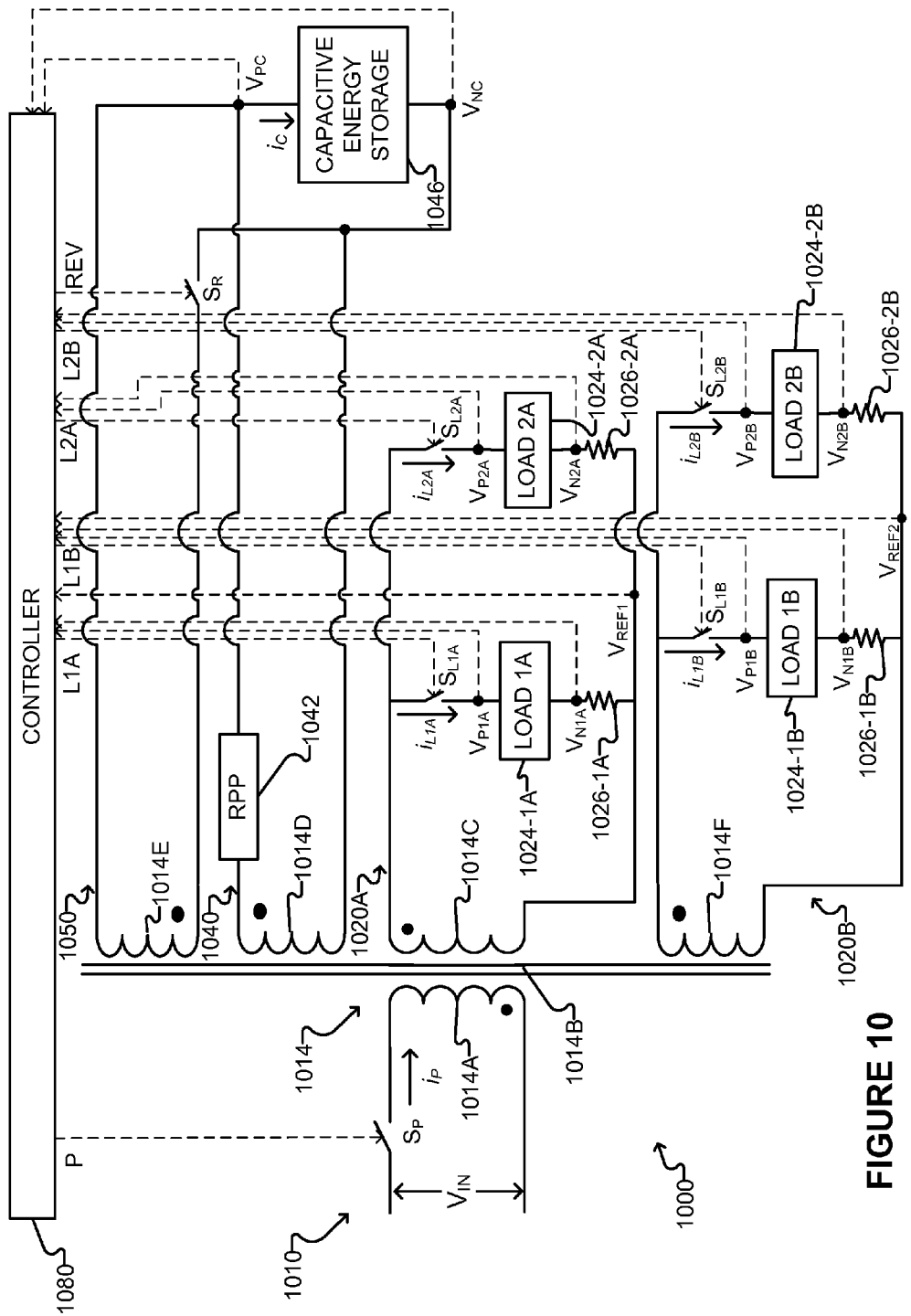
FIG. 10 is a block diagram of a power supply according to another example embodiment.

Power supply 1000 of FIG. 10 is similar to supply 400 of FIG. 4, except that instead of a single load circuit 420 as in the FIG. 4 example, supply 1000 comprises a first load circuit 1020A comprising loads 1024-1A and 1024-2A coupled to second winding 1014C, and a second load circuit 1020B comprising loads 1024-1B and 1024-2B coupled to a fifth winding 1014F. Controller 1080 monitors voltages $V_{P1A}$, $V_{N1A}$, $V_{P2A}$, $V_{N2A}$, $V_{P1B}$, $V_{N1B}$, $V_{P2B}$, $V_{N2B}$, $V_{REF1}$, $V_{REF2}$, $V_{PC}$ and $V_{NC}$ and generates control signals L1A, L2A, L1B, L2B and REV for respectively controlling load switches $S_{L1A}$, $S_{L2A}$, $S_{L1B}$ and $S_{L2B}$ and reverse switch $S_R$ in a similar fashion as described above. Also, first and second load circuits 1020A and 1020B do not include reverse polarity protectors. The remaining elements of supply 1000 correspond to like-numbered elements of supply 400 (with reference numerals in the form of 10xx in place of 4xx), and will not be described again.

Figure 11:
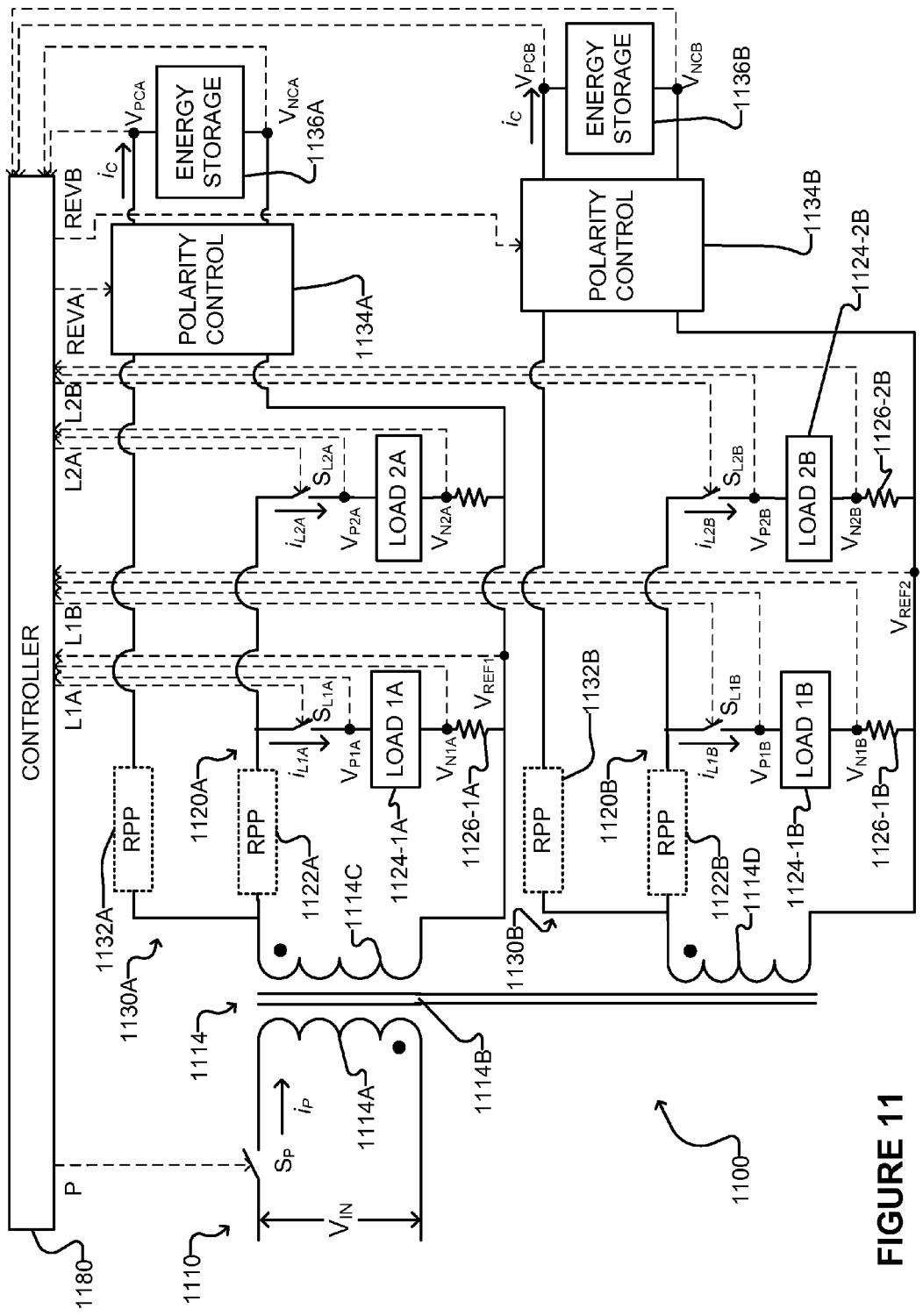
FIG. 11 is a block diagram of a power supply according to another example embodiment.

Power supply 1100 of FIG. 11 is similar to supply 100 of FIG. 1, except that instead of a single load circuit 120 and a single storage circuit 130 as in the FIG. 1 example, supply 1100 comprises a first load circuit 1120A and a first storage circuit 1130A coupled to second winding 1114C, and a second load circuit 1120B and a second storage circuit 1130B coupled to a third winding 1114D. Controller 1180 monitors voltages $V_{P1A}$, $V_{N1A}$, $V_{P2A}$, $V_{N2A}$, $V_{P1B}$, $V_{N1B}$, $V_{P2B}$, $V_{N2B}$, $V_{REF1}$, $V_{REF2}$, $V_{PCA}$, $V_{NCA}$, $V_{PCB}$ and $V_{NCB}$ and generates control signals L1A, L2A, L1B, L2B, REVA and REVB for respectively controlling load switches $S_{L1A}$, $S_{L2A}$, $S_{L1B}$ and $S_{L2B}$ and first and second polarity control blocks 1134A and 1134B in a similar fashion as described above. The remaining elements of supply 1100 correspond to like-numbered elements of supply 100 (with reference numerals in the form of 11xxA/B in place of 1), and will not be described again.

Figure 12:
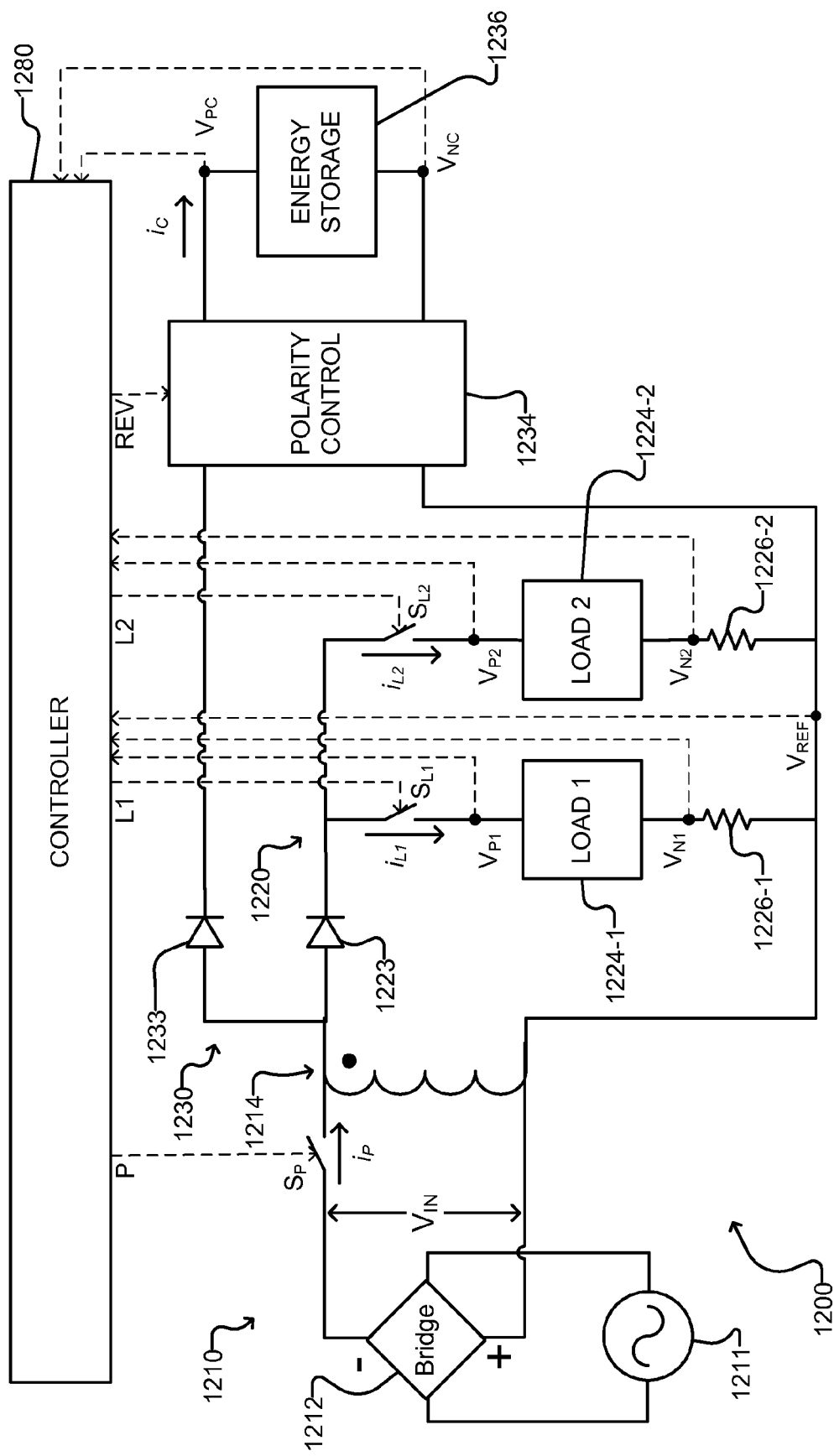
FIG. 12 is a block diagram of a power supply according to another example embodiment.

The example power supplies discussed above with respect to FIGS. 1 to 5 each have an inductor having two or more windings. However, it is to be understood that power supplies according to some embodiments may comprise an inductor with a single winding. FIG. 12 shows such an example power supply 1200.

Power supply 1200 of FIG. 12 is similar to supply 100 of FIG. 1, except that a single winding inductor 1214 is provided instead of multi-winding inductor 114. Input 1210 is connected to receive input voltage $V_{IN}$ from an AC power source 1211 and a bridge rectifier 1212. Supply 1200 also differs from supply 100 in that supply 1200 includes diodes 1223 and 1233 in place of reverse polarity protectors 122 and 132. Diodes 1223 and 1233 may be omitted in some embodiments and reverse polarity protection may instead be provided by proper control of the timing of load switches 1224-1 and 1224-2 and the switches of polarity control block 1234. The remaining elements of supply 1200 correspond to like-numbered elements of supply 100 (with reference numerals in the form of 12xx in place of 1xx), and will not be described again.

Figure 13A:
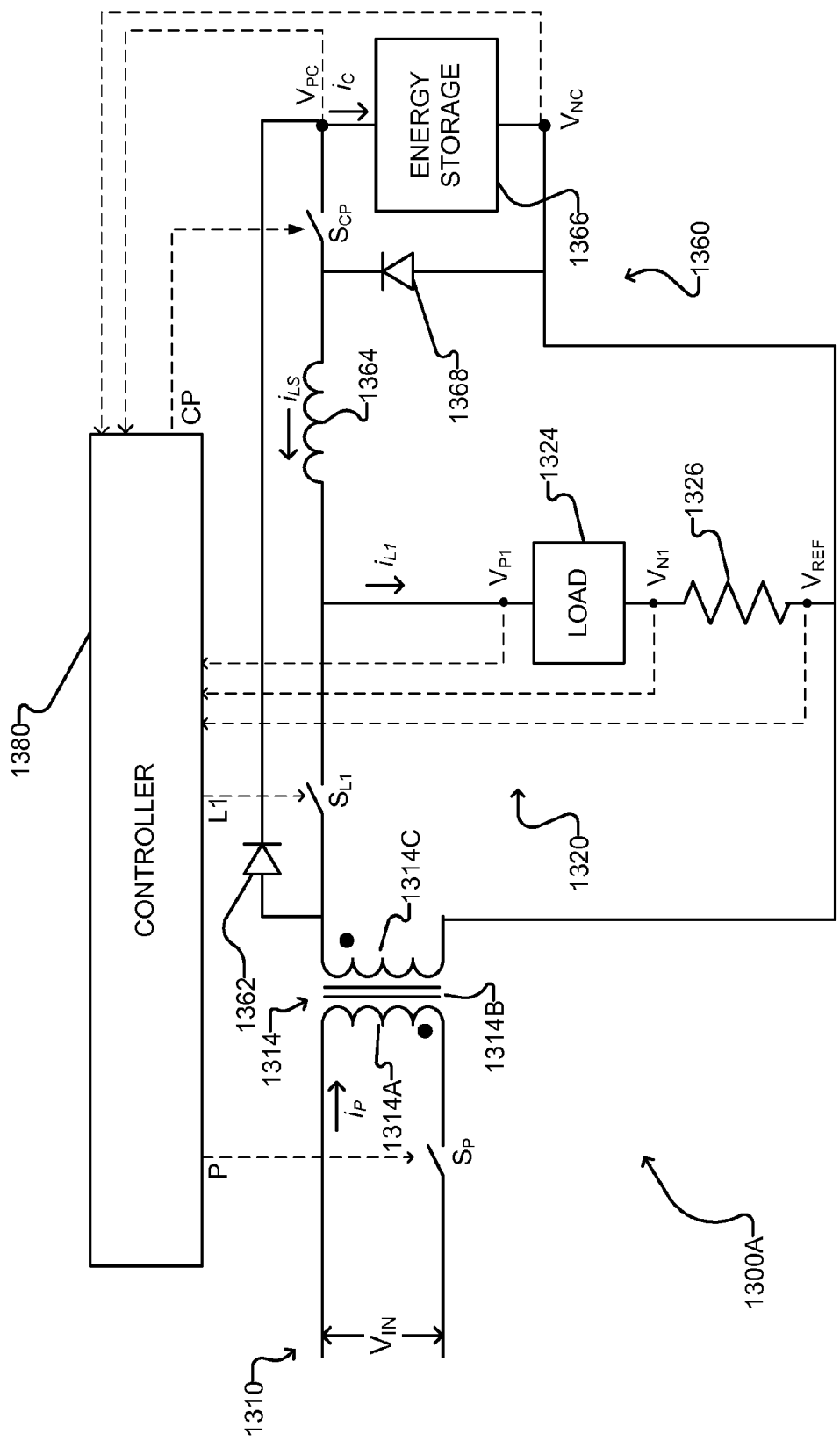
FIGS. 13A and 13B are block diagrams of power supplies according to other example embodiments.

FIG. 13A shows another example power supply 1300A according to one embodiment. Supply 1300A comprises an input 1310 connectable to receive an input voltage $V_{IN}$. Input voltage $V_{IN}$ may comprise, for example, a varying DC voltage such as a rectified sinusoidal AC input voltage, a rectified dimmer-modulated sinusoidal AC input voltage, or other types of input voltages.

A first winding 1314A of an inductor 1314 is selectably connectable to input 1310 through a primary switch $S_P$ in series with first winding 1314A. Inductor 1314 comprises a multi-winding inductor, which may sometimes be referred to as a transformer. Primary switch $S_P$ may be connected on either the high or low voltage side of first winding. When primary switch $S_P$ is connected to the high voltage side of first winding 1314A, primary switch $S_P$ may comprise a high-side switch. When primary switch $S_P$ is connected to the low voltage side of first winding 1314A as shown in FIG. 13A, primary switch $S_P$ may comprise a low-side switch, and lower control voltages may be used to control primary switch $S_P$.

First winding 1314A is inductively coupled to a second winding 1314C by a common core 1314B. First winding 1314A and second winding 1314C may have different numbers of turns. Core 1314B may be ferromagnetic or air filled or a combination thereof or other suitable materials. The configuration of inductor 1314 may be selected based on expected input voltages, voltage and current requirements of circuits connected to the second winding, and the operating frequency of primary switch $S_P$ of supply 1300A. In some embodiments, primary switch $S_P$ of supply 1300A may be configured to operate at frequencies of 25-100 MHz. In some embodiments, primary switch $S_P$ of supply 1300A may be configured to operate at frequencies over 1 Mhz.

Primary switch $S_P$ is controlled by a controller 1380 as described below to selectively provide the input voltage to first winding 1314A to energize inductor 1314. In some embodiments, switch $S_P$ is controlled to have a substantially constant duty cycle. In some embodiments, the duty cycle of switch $S_P$ is gradually adjusted over time to accommodate load requirements. In some embodiments, the duty cycle of switch $S_P$ may change over the period of the input voltage. For example, when the input voltage is provided through a dimmer which requires at least a holding current to be drawn therethrough to maintain the dimmer in conduction, in some embodiments the duty cycle of switch $S_P$ may be increased for portions of the input voltage period where the input voltage is near zero to maintain at least the holding current through the dimmer. In some embodiments, switch $S_P$ is configured to be open when a signal P from controller 1380 has a low value, and to be closed when signal P has a high value.

A load circuit 1320 is coupled to second winding 1314C. Load circuit 1320 comprises a load 1324 selectably connectable to receive current from second winding 1314C. In some embodiments load 1324 may comprise suitable power conditioning elements such as, for example, one or more capacitors connected in parallel with the load. In some embodiments, load 1324 may comprise, for example, LED lighting devices. It will be appreciated that in some embodiments supply 1300A may be provided without load 1324, and instead be provided with suitable connection elements for connecting thereto. In other embodiments supply 1300A may be provided with two or more loads. The illustrated example in FIG. 13A shows load 1324 connected to second winding 1314C through load switch $S_u$, but it is to be understood that load circuit 1320 could comprise any practical number of loads. Sensing resistor 1326 may be coupled between second winding 1314C and load 1324.

Controller 1380 is connected to monitor voltages $V_{P1}$, $V_{N1}$, and $V_{REF}$ to determine the condition of load 1324. Load switch $S_u$ is controlled by controller 1380 as described below to disconnect load 1324 from second winding 1314C when its load requirement is met. The load requirement may comprise, for example, a current requirement, a voltage requirement or a power requirement. In some embodiments, switch $S_{L1}$ is configured to be open when signal L1 from controller 1380 has a low value, and to be closed when signals L1 has a high value.

A storage circuit 1360 is also coupled to second winding 1314C. Storage circuit 1360 comprises an energy storage element 1366 connected across second winding 1314C through a diode 1362. Energy storage element 1366 is also selectably connectable to load circuit 1320 though a secondary inductor 1364 and a coupling switch $S_{CP}$. A diode 1368 provides a path for the current to flow from the secondary inductor 1364 to load 1324 when coupling switch $S_{CP}$ is opened, as discussed below. Energy storage element 1366 may, for example, comprise a capacitive storage element having one or more capacitors. Controller 1380 is connected to monitor voltages $V_{PC}$ and $V_{NC}$ to determine the charge stored on and/or voltage of energy storage element 1366. Note that in this example $V_{NC}$ is at the same potential as $V_{REF}$.

Figure 13B:
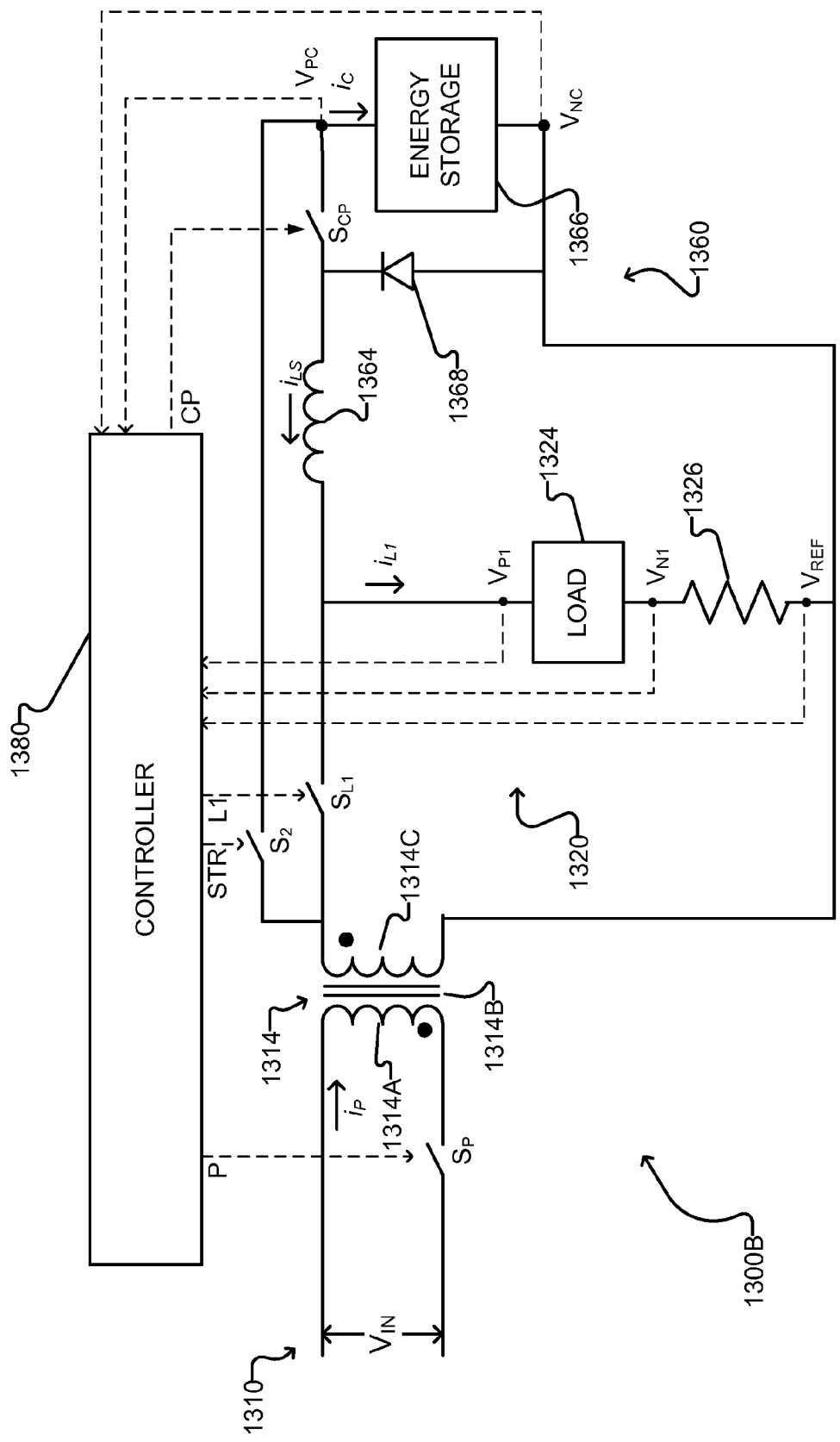

FIG. 13B shows another example power supply 1300B according to one embodiment. Supply 1300B is substantially the same as supply 1300A of FIG. 13A, with the exception of switch $S_2$ controlled by control signal STR in place of diode 1362. The remaining elements of supply 1300B correspond to like-numbered elements of supply 1300A, and will not be described in detail again. In supply 1300B there is synchronous switching of switches $S_{L1}$ and $S_2$, meaning that switch $S_2$ is closed substantially simultaneously with the opening of switch $S_{L1}$ if there is energy remaining in inductor 1314 when the load conditions are satisfied.

In supplies 1300A and 1300B, as well as in the other example embodiments discussed above, the load(s) may be any combination of components. The sense resistors may be resistors in combination with other components such as for example capacitors. The switches may be located in series above or below the load. The controller may use any combination of $V_{P1}$, $V_{N1}$ and $V_{REF}$ to sense load voltage and/or current.

Figure 14A:
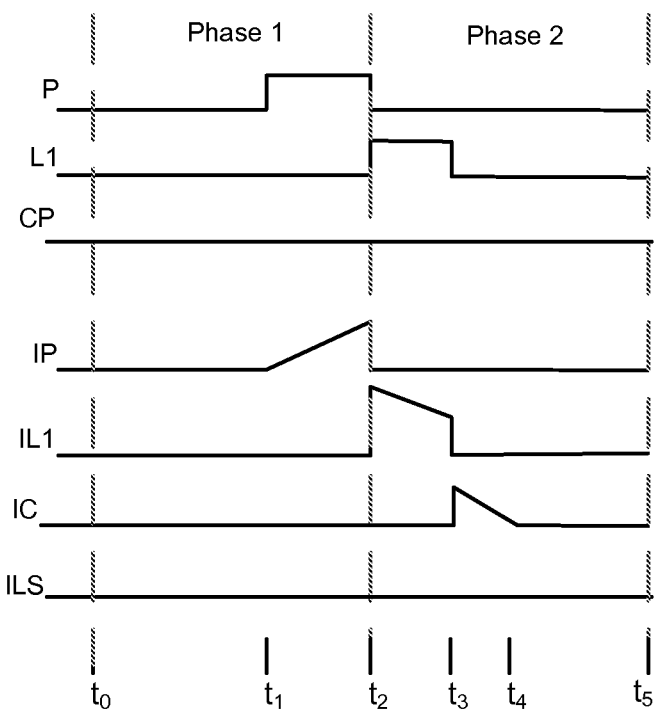
FIGS. 14A and 14B show example timing diagrams illustrating operation of power supplies according to the embodiment of FIG. 13A.
Figure 14B:
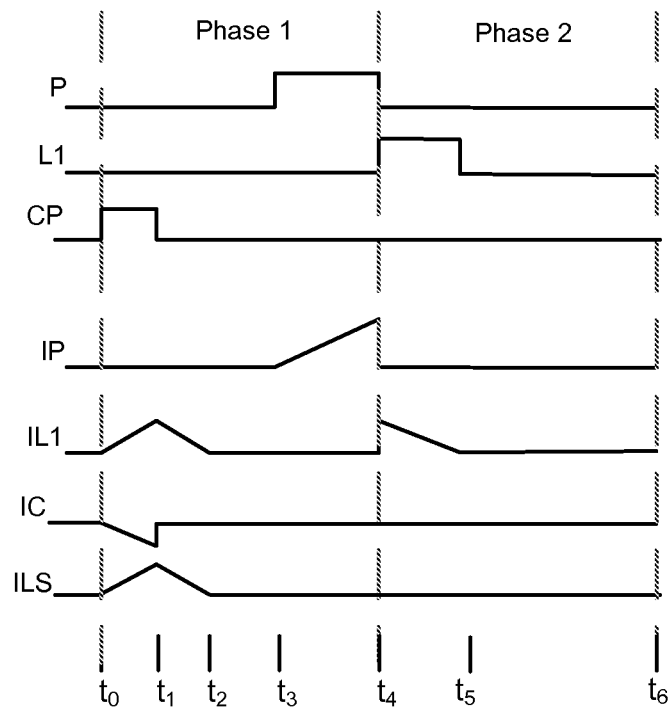
Figure 15A:
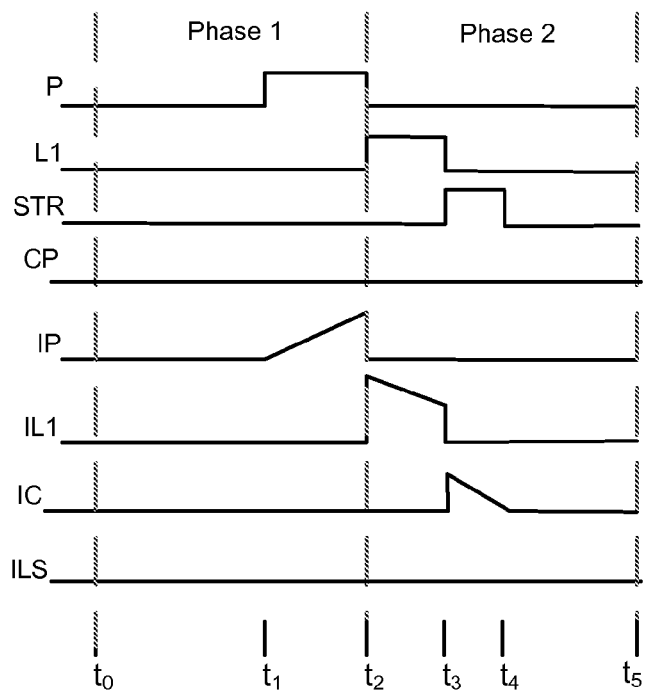
FIGS. 15A and 15B show example timing diagrams illustrating operation of power supplies according to the embodiment of FIG. 13B.
Figure 15B:
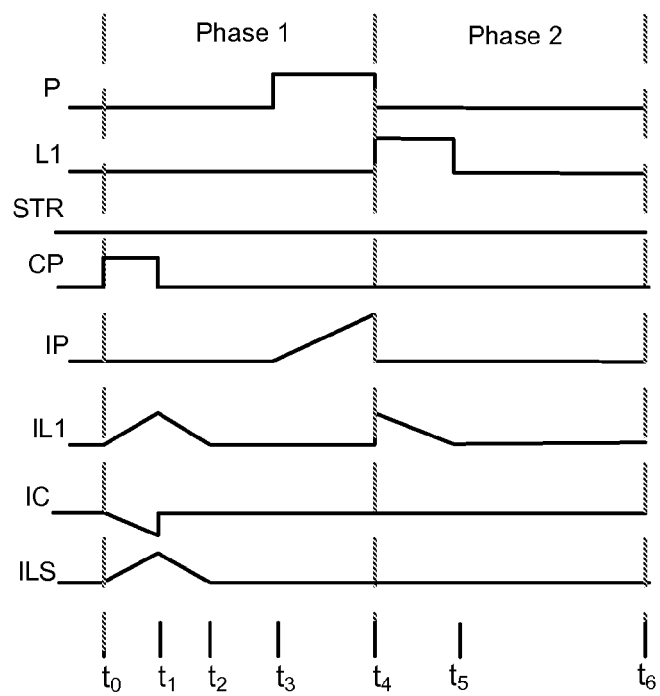

FIGS. 14A and 14B show timing diagrams 1400A and 1400B illustrating example operations of a power supply such as supply 1300A. FIGS. 15A and 15B show timing diagrams 1500A and 1500B illustrating example operations of a power supply system such as supply 1300B. FIGS. 14A and 15A show examples wherein excess current is available for storage in an energy storage element. FIGS. 14B and 15B show examples wherein supplementary current is provided from the energy storage element.

FIGS. 14A and 14B show signals P, L1 and CP for controlling corresponding switches/elements of the power supply. FIGS. 15A and 15B show the same signals, with the addition of a signal STR for controlling a switch $S_2$. FIGS. 14A, 14B, 15A and 15B also show resulting current traces IP, IL1, IC and ILS provided to a first inductor (such as for example inductor 1314 shown in FIGS. 13A and 13B), load, energy storage element (such as for example energy storage element 1366 shown in FIGS. 13A and 13B), and secondary inductor (such as for example inductor 1364 shown in FIGS. 13A and 13B) respectively, as indicated by currents $i_P$, $i_{L1}$, $i_C$ and $i_{LS}$ shown in FIGS. 13A and 13B. The time period shown in each of FIGS. 14A, 14B, 15A and 15B is divided into two phases, individually labeled phase 1 and phase 2. In phase 1, a first inductor is energized by providing the input voltage to the first inductor, and a secondary inductor (such as for example inductor 1364 shown in FIGS. 13A and 13B) is energized by discharge of current from the energy storage element (in the case of FIGS. 14B and 15B). In phase 1, if the load requirements were not met in the previous iteration through phase 2, any energy transferred to the second inductor is provided to the load. In phase 2, current is provided from the first inductor to the load until the load requirement is met, and then any excess current is used to charge the energy storage element (in the case of FIGS. 14A and 15A).

Referring to FIGS. 14A and 15A, phase 1 begins at time $t_0$ with all of signals P, L1 and CP (and STR in the case of FIG. 15A) low, meaning that the primary switch, the load switch and the switch SCP are open, and currents IP, IL1, IC and ILS are all zero. At time $t_1$ the primary switch is closed, which causes current IP to ramp up. Time $t_1$ may be adjusted based on the power requirement of the load. For example time $t_1$ may occur earlier (as early as $t_0$) to provide more current to the inductor, or may occur later to provide less current to the inductor. In some embodiments where a power supply receives power through a thyristor-type dimmer which requires at least a holding current to maintain proper operation, time $t_1$ may also be adjusted to maintain the holding current during any valleys in the input waveform.

Phase 2 begins at time $t_2$, when the primary switch is opened and the load switch is closed. When the primary switch is opened, current cannot flow back to the input so energy in the first inductor must find another outlet. Closing the load switch permits current to flow to the load, as indicated by current trace IL1. Referring to FIG. 14A, current does not flow to the energy storage element as long as the load is at a lower voltage than the energy storage element, which is generally the case. Referring to FIG. 15A, switch $S_2$ is open and current does not flow to the energy storage element.

In some embodiments, the power supply may be controlled to perform an initialization routine upon startup to establish suitable timings for the controller and to charge the energy storage element to a desired voltage level. In some embodiments, the initial desired voltage level of the energy storage element may be selected to be higher than a normal operating voltage of the load, but not so high as to risk overvoltage conditions on the load.

In some embodiments, the controller is connected to be powered from the input voltage, and the initialization routine may comprise suitable "soft start" techniques as known in the art to ensure proper controller operation. In some embodiments, the controller is connected to be powered from a winding of the inductor other than the winding connected to the input voltage, and the initialization routine may comprise providing a series of low duty cycle pulses to the primary switch to provide power for initializing the control circuitry.

Referring to FIGS. 14A and 15A, at time $t_3$ the load requirement for the load is met, and the load switch is opened as indicated by signal L1 transitioning from high to low. With the load switch open, any remaining energy in the inductor flows as current to the energy storage element, as indicated by current trace IC. At time $t_4$ all of the energy stored in the inductor has been transferred, and current flow to the energy storage element ends. In the case of FIG. 15A, the switch S2 is closed at time $t_3$ to allow current to flow to the energy storage element, and opened at time $t_4$. Time $t_5$ represents the end of phase 2 and the latest time to open the load switch.

Referring to FIGS. 14B and 15B, operation during phase 1 begins at time $t_0$ when signals P and L1 are low and when switch $S_{CP}$ is closed as indicated by signal CP transitioning from low to high. In the illustrated examples, switch $S_{CP}$ is closed at the beginning of phase 1, but this is not required. For example, in some embodiments, there may be a delay between the beginning of phase 1 and the closing of switch $S_{CP}$. The timing of the closing of switch $S_{CP}$ may be determined based on results from the previous phase 2. Depending on the speed of the controller, it may take some time at the beginning of phase 1 to compute the results and close $S_{CP}$. There may also be other factors, such as for example the stability of the control loop, emitted noise, etc., which may make it desirable to close switch $S_{CP}$ at some time other than the very beginning of phase 1. Closing switch $S_{CP}$ permits discharge of current from the energy storage element, which energizes the secondary inductor (such as for example inductor 1364 in FIGS. 13A and 13B) and causes current to flow from the secondary inductor to the load. At time $t_1$, switch is opened as indicated by signal CP transitioning from high to low. Current keeps flowing from the secondary inductor to the load as indicated by current traces IL1 and ILS. Current does not flow to the energy storage element since switch $S_{CP}$ is open. Current to the load flows via diode 1368 until there is no energy remaining in the secondary inductor.

At time $t_2$, current flow from the secondary inductor to the load ends as indicated by current traces IL1 and ILS. From this point on, operation during phase 1 in FIGS. 14B and 15B is the same as described above with respect to FIGS. 14A and 15A, respectively. At time $t_3$, the primary switch is closed as indicated by signal P transitioning from low to high. In the illustrated examples, the primary switch is closed after current flow from the secondary inductor to the load has ended, but this is not required. For example, in some embodiments, current may be flowing from the secondary conductor to the load at the same time as current is being provided to the first inductor (e.g., time $t_3$ may occur before time $t_2$).

Phase 2 begins at time $t_4$ with the opening of the primary switch as indicated by signal P transitioning from high to low. At substantially the same time, the load switch is closed as indicated by signal L1 transitioning from low to high.

As the voltage across the first inductor decays, at time $t_5$ current stops flowing to the load. Current will stop flowing to a load when the energy of the first inductor is depleted. In the examples shown in FIGS. 14B and 15B, the load switch is opened at time $t_5$. The switch $S_2$ remains open (as indicated by signal STR in FIG. 15B) since there is no surplus energy to be stored in the energy storage element. Time $t_6$ represents the end of phase 2 and the latest time to open the load switch.

The above examples discuss operation in situations where there is substantially zero energy remaining in the first inductor at time $t_4$ in FIGS. 14A and 15A and at time $t_5$ in FIGS. 14B and 15B. In some situations, some energy may still remain in the first inductor. In such situations power supplies according to certain embodiments may be operated in a continuous mode. In the continuous mode, there is still some finite current flow at the end of phase 2, so that there is energy in the inductor at the beginning of phase 1. Generally, the controller may be configured such that continuous mode is avoided. If continuous mode happens on occasion, feedback from the system may be used to eliminate it quickly. If there is sufficient calculation capacity in the controller, the phase durations can be altered to avoid the continuous mode.

Figure 17:
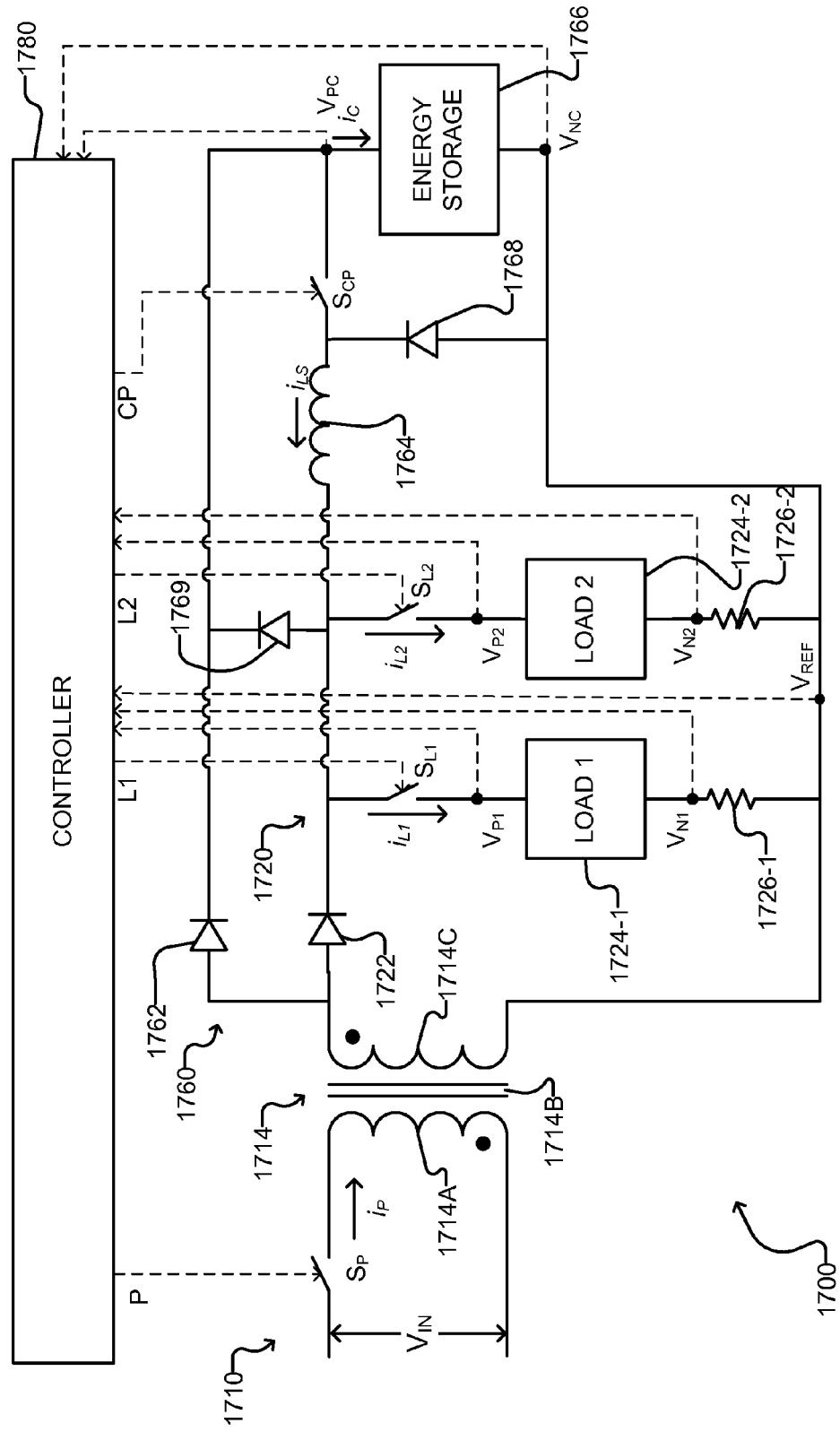
FIG. 17 is a block diagram of a power supply according to another example embodiment.

FIGS. 13A and 13B show example power supplies wherein a secondary inductor is used in powering a single load. Similar techniques may be applied to powering more than one load. FIG. 17 shows an example power supply 1700 according to such an embodiment with two loads, but it is to be understood that supply 1700 could be configured to power any practical number of loads.

Supply 1700 of FIG. 17 is substantially the same as supply 1300A of FIG. 13A, with the exception that supply 1700 is adapted to supply power to two loads 1724-1 and 1724-2 (each having a respective load switch $S_{L1}/S_{L2}$ in series therewith, with controller 1780 connected to monitor the load parameters), a reverse polarity protector in the form of a diode 1722 is provided in the location of switch $S_{L1}$ in FIG. 13A, and an additional diode 1769 connected between load circuit 1720 and storage circuit 1760. The remaining elements of supply 1700 correspond to like-numbered elements of supply 1300A (with reference numerals in the form of 17xx in place of 13xx), and will not be described in detail again. The operation of supply 1700 is likewise substantially similar to the operation of supply 1300A, with the exception that due to the placement of load switches $S_{L1}$ and $S_{L2}$, current will not flow to loads 1724-1 and 1724-2 if load switches $S_{L1}$ and $S_{L2}$ are open. Diode 1769 (in combination with diode 1768) allows energy in secondary inductor 1764 to flow as current back to energy storage element 1766 in the case where there is energy still in secondary inductor 1764 and all of the load switches are open. If load switches $S_{L1}$ and/or $S_{L2}$ are closed, current can flow from secondary inductor 1764 to loads 1724-1 and/or 1724-2 through diode 1768 as described above with reference to FIG. 13A.

Figure 16:
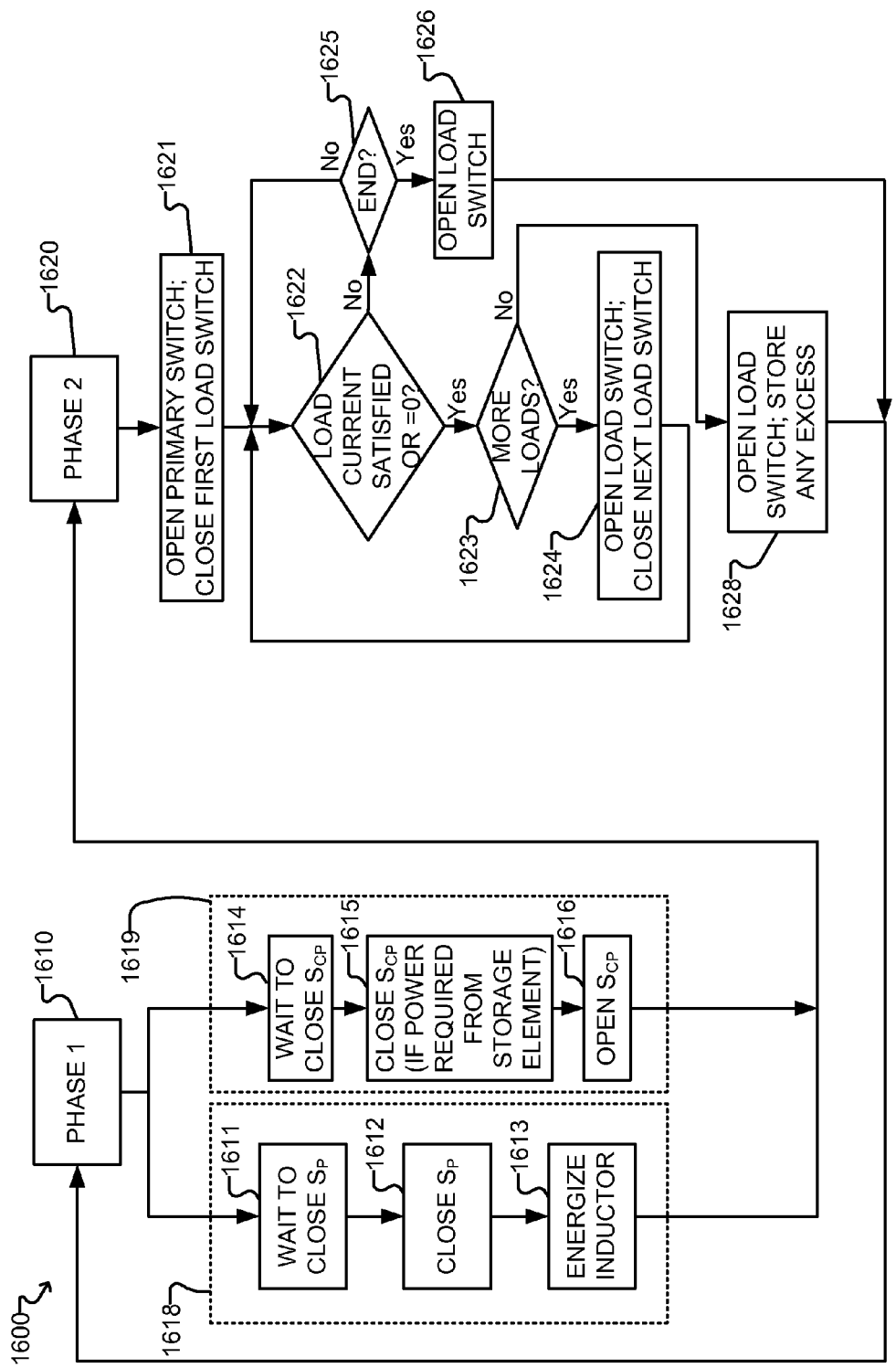
FIG. 16 is a flowchart illustrating a method according to an example embodiment.

FIG. 16 is a flowchart illustrating an example method 1600 according to one embodiment. Method 1600 may, for example be carried out by a controller of a power supply such as any of supplies 1300A, 1300B, or 1700 described above. Method 1600 cycles through two phases, the startings of which are indicated by blocks 1610 and 1620. In some embodiments, the controller may be configured to implement method 1600 such that blocks 1610 and 1620 occur at substantially regular intervals, such that substantially fixed intervals are allotted to each of the two phases. In some embodiments, some or all of the phases may have intervals of the same duration. In some embodiments, the phases may have intervals of different durations.

Phase 1 starts at block 1610. There are two parallel paths 1618 and 1619 in phase 1 which are substantially independent of one another. At block 1611 in path 1618, the controller waits an amount of time based on the load power requirements. In some embodiments, the wait time may be reduced during times when the input voltage nears zero to maintain at least a holding current in implementations where the input voltage is provided through a phase-cut dimmer. At block 1612 a primary switch is closed, and an inductor is energized at block 1613 until the end of phase 1, at which point method 1600 proceeds to block 1620. At block 1614 in path 1619, the controller optionally waits an amount of time based on the power required from the energy storage element. At block 1615 a switch $S_{CP}$ connecting the energy storage element to the secondary inductor is closed, and power is drawn from the energy storage element as required to energize the secondary inductor. The timing of the closing of switch $S_{CP}$ may be determined based on results from the previous phase 2. Depending on the speed of the controller, it may take some time at the beginning of phase 1 to compute the results and close $S_{CP}$. There may also be other factors, such as for example the stability of the control loop, emitted noise, etc., which may make it desirable to close switch $S_{CP}$ at some time other than the very beginning of phase 1. At block 1616 the switch is opened when no more current from the energy storage element is required. After block 1616 the controller waits until the end of Phase 1, at which point method 1600 proceeds to block 1620.

Phase 2 begins at block 1620, and at block 1621 the primary switch ($S_P$) is opened and the first load switch is closed to draw current from the inductor. At block 1622 the controller determines the load conditions for the load whose load switch is closed (the "current load"), and compares the load conditions to one or more load requirements. If the load requirements are not met for the current load (block 1622 No output) method 1600 proceeds to block 1625, where the controller determines if it is the end of phase 2. If not (block 1625 No output), method 1600 cycles through blocks 1622 and 1625 until either the load requirements for the current load are met (block 1622 Yes output) or the end of phase 2 (block 1625 Yes output). If it is the end of phase 2 (block 1625 Yes output), method 1600 proceeds to block 1626 where the controller opens the load switch for the current load. After block 1626 method 1600 proceeds to block 1610 to begin phase 1 again. If the load requirements are met for the current load (block 1622 Yes output) method 1600 proceeds to block 1623, where the controller determines if there are more loads. If there are more loads (block 1623 Yes output) method 1600 proceeds to block 1624. At block 1624 the controller opens the load switch for the current load and closes the load switch for the next load at substantially the same time. Method 1600 then returns to block 1622 and repeats the sequence described above for the second load and so on until at block 1623 it is determined that there are no more loads (block 1623 No output), or until the end of phase 2 (block 1625 Yes output). In embodiments with a single load (such as the examples of FIGS. 13A and 13B), blocks 1623 and 1624 may be omitted. If and when the load requirements for all of the loads have been satisfied (block 1623 No output), method 1600 proceeds to block 1628. At block 1628 the controller opens the load switch and energy remaining in the inductor is stored in an energy storage element. After block 1628 method 1600 then proceeds to block 1610 to begin phase 1 again.

In some embodiments, power supplies such as those described above may be used for efficiently powering LED-based lighting devices. Some embodiments may provide combined power supplies and LED-based lighting devices which may be used to replace existing lighting devices, such as incandescent, halogen or fluorescent lights, in order to significantly reduce power consumption for lighting purposes. As one skilled in the art will appreciate, power supplies according to some embodiments provide improved power factor in comparison to certain prior art power supplies. Improving the power factor provides for more efficient delivery of electrical power from a power producer to the power consumer. This contributes to the more efficient utilization and conservation of energy resources, including the reduction of energy consumption in applications such as household appliances and lighting systems.

Certain implementations of the invention may comprise computer hardware, software or both hardware and software components which perform a method of the invention. For example, one or more processors in a control system for a device may implement methods as described herein by executing software instructions in a program memory accessible to the processors. Processing hardware in such embodiments may include one or more appropriately-configured programmable processors, programmable logic devices (such as programmable array logic ("PALs") and programmable logic arrays ("PLAs")), digital signal processors ("DSPs"), field programmable gate arrays ("FPGAs"), application specific integrated circuits ("ASICs"), large scale integrated circuits ("LSIs"), very large scale integrated circuits ("VLSIs") or the like. As one skilled in the art will appreciate, these example embodiments are for illustrative purposes only, and methods and systems according to embodiments of the invention may be implemented in any suitable device having appropriately configured processing hardware. In some embodiments, the invention may be implemented in software. For greater clarity, "software" includes (but is not limited to) firmware, resident software, microcode, and the like. Both processing hardware and software may be centralized or distributed (or a combination thereof), in whole or in part, as known to those skilled in the art.

Certain embodiments may also be provided in the form of a computer program product accessible from a computer-readable medium for use by or in connection with processing hardware. A computer-readable medium can be any medium which carries a set of computer-readable signals comprising instructions which, when executed by processing hardware, causes the processing hardware to execute a method of the invention. A computer-readable medium may be in any of a wide variety of forms, including an electronic or semiconductor system (e.g. ROM and flash RAM), magnetic or electromagnetic system (e.g. floppy diskettes and hard disk drives), or optical or infrared system (e.g. CD ROMs and DVDs). The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A power supply comprising:
   a first winding selectably connectable to receive a varying input voltage through a primary switch;
   a second winding inductively coupled to the first winding;
   a load circuit comprising one or more loads selectably connectable to the second winding through one or more load switches;
   a storage circuit comprising an energy storage element connected in a first polarity to the second winding through a reverse polarity protector;
   a discharge circuit comprising a reverse switch for selectably connecting the energy storage element in a second polarity opposite to the first polarity to a third winding inductively coupled to the first and second windings; and,
   a controller configured to monitor load conditions of the one or more loads and generate control signals for controlling the primary switch, the one or more load switches, and the reverse switch.

2. A power supply according to claim 1 wherein the reverse polarity protector comprises a diode.

3. A power supply according to claim 1 wherein the reverse polarity protector comprises a forward switch, and wherein the controller is configured to generate a control signal for controlling the forward switch.

4. A power supply according to claim 1 wherein the varying input voltage comprises a rectified AC voltage having a first frequency, and wherein the controller controls the primary switch at a second frequency substantially higher than the first frequency.

5. A power supply according to claim 4 wherein the second frequency exceeds 1 MHz.

* * * * *